US012641238B2

(12) United States Patent
Wang et al.

(10) Patent No.: US 12,641,238 B2
(45) Date of Patent: May 26, 2026

(54) METHOD AND APPARATUS FOR TEMPORAL RESAMPLING

(71) Applicant: Alibaba (China) Co., Ltd., Zhejiang (CN)

(72) Inventors: Shurun Wang, Beijing (CN); Jie Chen, Beijing (CN); Yan Ye, San Diego, CA (US); Shiqi Wang, Kowloon Tong (HK)

(73) Assignee: Alibaba (China) Co., Ltd., Hangzhou (CN)

( * ) Notice: Subject to any disclaimer, the term of this patent is extended or adjusted under 35 U.S.C. 154(b) by 199 days.

(21) Appl. No.: 18/392,715

(22) Filed: Dec. 21, 2023

(65) Prior Publication Data

US 2024/0223764 A1     Jul. 4, 2024

Related U.S. Application Data

(60) Provisional application No. 63/436,625, filed on Jan. 1, 2023.

(51) Int. Cl.
| | |
|---|---|
| *H04N 19/132* | (2014.01) |
| *H04N 19/172* | (2014.01) |
| *H04N 19/31* | (2014.01) |
| *H04N 19/46* | (2014.01) |
| *H04N 19/587* | (2014.01) |

(Continued)

(52) U.S. Cl.
CPC ......... *H04N 19/132* (2014.11); *H04N 19/172* (2014.11); *H04N 19/31* (2014.11); *H04N 19/46* (2014.11); *H04N 19/587* (2014.11); *H04N 19/59* (2014.11); *H04N 19/70* (2014.11)

(58) Field of Classification Search
None
See application file for complete search history.

(56) References Cited

U.S. PATENT DOCUMENTS

| | | |
|---|---|---|
| 2020/0275129 A1 | 8/2020 | Deshpande |
| 2021/0104019 A1* | 4/2021 | Chujoh ................. G06T 3/4053 |

(Continued)

FOREIGN PATENT DOCUMENTS

| | | |
|---|---|---|
| CN | 1984329 A | 6/2007 |
| CN | 111726637 A | 9/2020 |
| JP | 2022156140 A | 10/2022 |

OTHER PUBLICATIONS

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

(Continued)

*Primary Examiner* — Mohammed Jebari
(74) *Attorney, Agent, or Firm* — Finnegan, Henderson, Farabow, Garrett & Dunner, LLP

(57) ABSTRACT

Methods and apparatuses are provided for encoding and decoding video data based on a supplemental enhancement information (SEI) message. An exemplary method includes: generating a reconstructed frame sequence based on a compressed video; decoding a supplemental enhancement information (SEI) message with respect to the reconstructed frame sequence, according to the compressed video; and performing temporal upsampling to the reconstructed frame sequence based on the SEI message by using a neural network.

19 Claims, 14 Drawing Sheets

(51) Int. Cl.
　　H04N 19/59　　　(2014.01)
　　H04N 19/70　　　(2014.01)

(56)　　　　　References Cited

U.S. PATENT DOCUMENTS

| | | |
|---|---|---|
| 2021/0203997 A1 | 7/2021 | Veselov et al. |
| 2022/0329837 A1 | 10/2022 | Li et al. |
| 2024/0089510 A1 * | 3/2024 | Deshpande ............ H04N 19/70 |
| 2024/0114170 A1 * | 4/2024 | Maharana ............... G06T 7/246 |
| 2024/0205462 A1 * | 6/2024 | Deshpande ............ H04N 19/85 |
| 2024/0221231 A1 * | 7/2024 | Deshpande ............ H04N 19/86 |
| 2024/0236312 A1 * | 7/2024 | Takada ................... H04N 19/40 |
| 2024/0275960 A1 * | 8/2024 | Poirier ................. H04N 19/117 |
| 2024/0340457 A1 * | 10/2024 | Deshpande ............ H04N 19/85 |
| 2025/0016381 A1 * | 1/2025 | Deshpande .......... H04N 19/132 |
| 2025/0168411 A1 * | 5/2025 | Tan ...................... H04N 19/172 |
| 2025/0218051 A1 * | 7/2025 | Wang ..................... H04N 19/86 |
| 2025/0220168 A1 * | 7/2025 | Ghaznavi Youvalari .................... H04N 19/172 |

OTHER PUBLICATIONS

McCarthy et al., "Additional SEI messages for VSEI (Draft 2)," JVET-AA2006-v2, $27^{th}$ Meeting, by teleconference, Jul. 13-22, 2022, 18 pages.
Sullivan et al., "Overview of the High Efficiency Video Coding (HEVC) Standard," IEE Transactions on Circuits and Systems for Video Technology, vol. 22, No. 12, pp. 1649-1668 (2012).
Chujoh et al., "AHG9/AHG11 Level information for super-resolution neural network," JVET-U0053, 21st Meeting, by teleconference, Jan. 6-15, 2021, 6 pages.
PCT International Search Report and Written Opinion mailed Mar. 29, 2024, issued in corresponding International Application No. PCT/CN2023/142136 (8 pgs.).

* cited by examiner

1000

1010 — Generate a reconstrued frame sequence based on a compressed video

1020 — Decode a supplemental enhancement information (SEI) message with respect to the reconstrued frame sequence, according to the compressed video 1030 — Perform temporal upsampling to the reconstrued frame sequence based on the SEI message by using a neural network

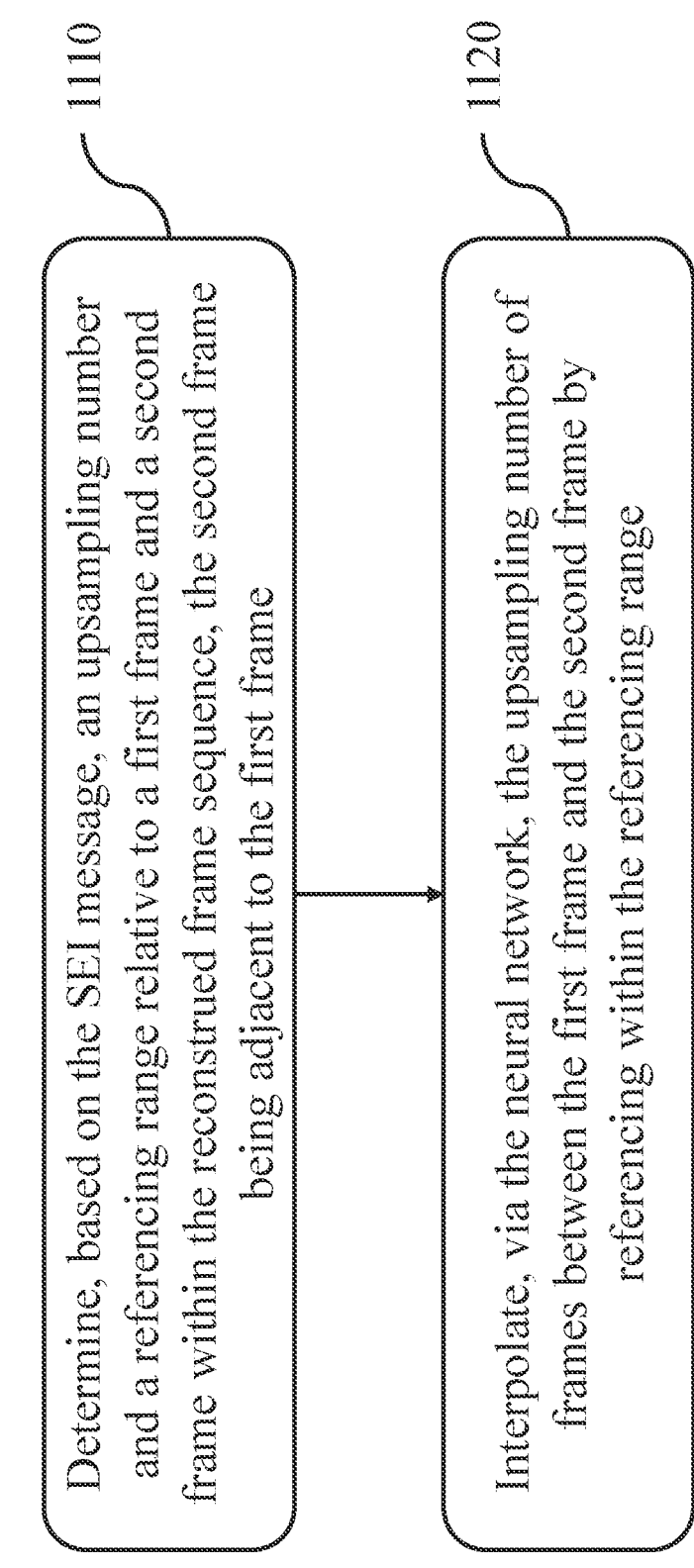

1030

1110

Determine, based on the SEI message, an upsampling number and a referencing range relative to a first frame and a second frame within the reconstrued frame sequence, the second frame being adjacent to the first frame

1120

Interpolate, via the neural network, the upsampling number of frames between the first frame and the second frame by referencing within the referencing range

| mpfc_purpose
0000000000000000000001001 (5)
1301 | mpfc_temp_factor
0000000000000000000000100 (2)
1302 | mpfc_temp_strength
0100 (2)
1303 |

1400

| mpfc_purpose
0000000000000000000001001 (5)
1401 | mpfc_temp_factor
0000000000000000000000100 (2)
1402 | mpfc_temp_strength
0000 (0)
1403 | mpfc_imp_range
0000000000000000000001000 (8)
1404 |

1500

| mpfc_purpose
0000000000000000000001001 (5)
1501 | mpfc_temp_factor
0000000000000000000000100 (2)
1502 | mpfc_imp_range
0000000000000000000001000 (8)
1503 |

1120

1610

Generate, based on the upsampling number and the referencing range, input tensors for the neural network

1620

Receive output tensors regarding the upsampling number of frames from the neural network

METHOD AND APPARATUS FOR TEMPORAL RESAMPLING

CROSS-REFERENCE TO RELATED APPLICATIONS

The disclosure claims the benefits of priority to U.S. Provisional Application No. 63/436,625, filed on Jan. 1, 2023, which is incorporated herein by reference in its entirety.

TECHNICAL FIELD

The present disclosure generally relates to video processing, and more particularly, to methods and apparatuses for temporal resampling based on supplemental enhancement information (SEI) messages.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for performing temporal resampling towards machine vision tasks based on SEI messages.

According to some exemplary embodiments, there is provided a decoding method including: generating a reconstructed frame sequence based on a compressed video; decoding a SEI message with respect to the reconstructed frame sequence, according to the compressed video; and performing temporal upsampling to the reconstructed frame sequence based on the SEI message by using a neural network.

According to some exemplary embodiments, there is provided an encoding method including: compressing a frame sequence; and encoding a SEI message for the frame sequence, wherein the SEI message indicates whether to perform temporal upsampling to the frame sequence by using a neural network.

According to some exemplary embodiments, there is provided a non-transitory computer readable storage medium storing a bitstream of a video. The bitstream includes: a SEI message with respect to the frame sequence, wherein the SEI message includes information descriptive of performing temporal upsampling to the frame sequence by using a neural network.

According to some exemplary embodiments, there is provided a non-transitory computer readable storage medium storing a bitstream of a video generated by a method including: compressing a frame sequence; and encoding a SEI message for the frame sequence, wherein the SEI message indicates whether to perform temporal upsampling to the frame sequence by using a neural network.

According to some exemplary embodiments, there is provided a decoding apparatus including: a memory storing a set of instructions; and one or more processors configured to execute the set of instructions to cause the apparatus to perform operations including: generating a reconstructed frame sequence based on a compressed video; decoding a SEI message with respect to the reconstructed frame sequence, according to the compressed video; and performing temporal upsampling to the reconstructed frame sequence based on the SEI message by using a neural network.

According to some exemplary embodiments, there is provided an encoding apparatus including: a memory storing a set of instructions; and one or more processors configured to execute the set of instructions to cause the apparatus to perform operations including: compressing a frame sequence; and encoding a SEI message for the frame sequence, wherein the SEI message indicates whether to perform temporal upsampling to the frame sequence by using a neural network.

BRIEF DESCRIPTION OF THE DRAWINGS

Embodiments and various aspects of the present disclosure are illustrated in the following detailed description and the accompanying figures. Various features shown in the figures are not drawn to scale.

FIG. 11 illustrates a flowchart of sub-steps of the exemplary method for decoding video data shown in FIG. 10, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) has been developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

The neural network post-processing filter has been adopted in image processing. Some existing techniques utilize SEI messages for specifying post-processing filter characteristics for the neural network post-processing filter. However, temporal upsampling towards machine vision is not considered when generating the SEI messages. Therefore, there is a need for realizing the temporal upsampling for machine vision based on SEI messages.

Figure 1:
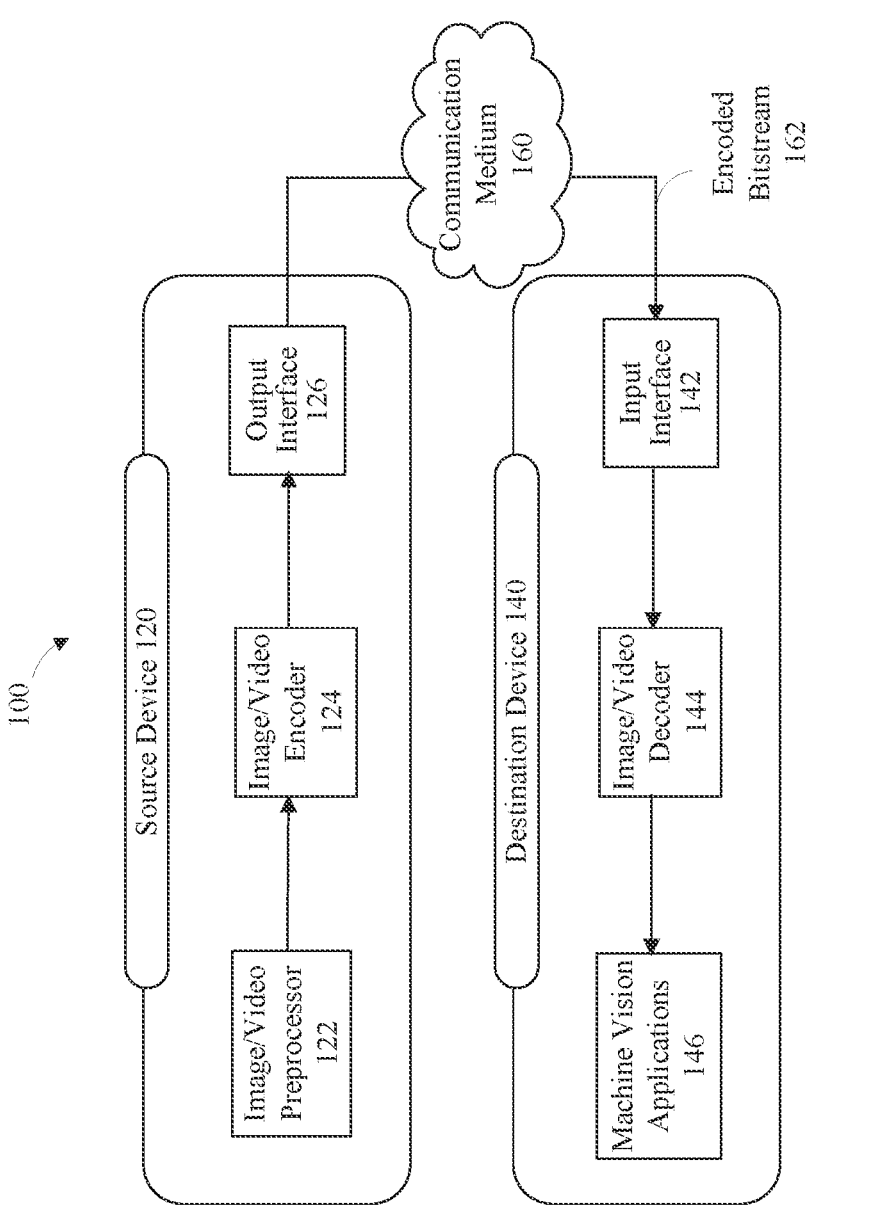
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
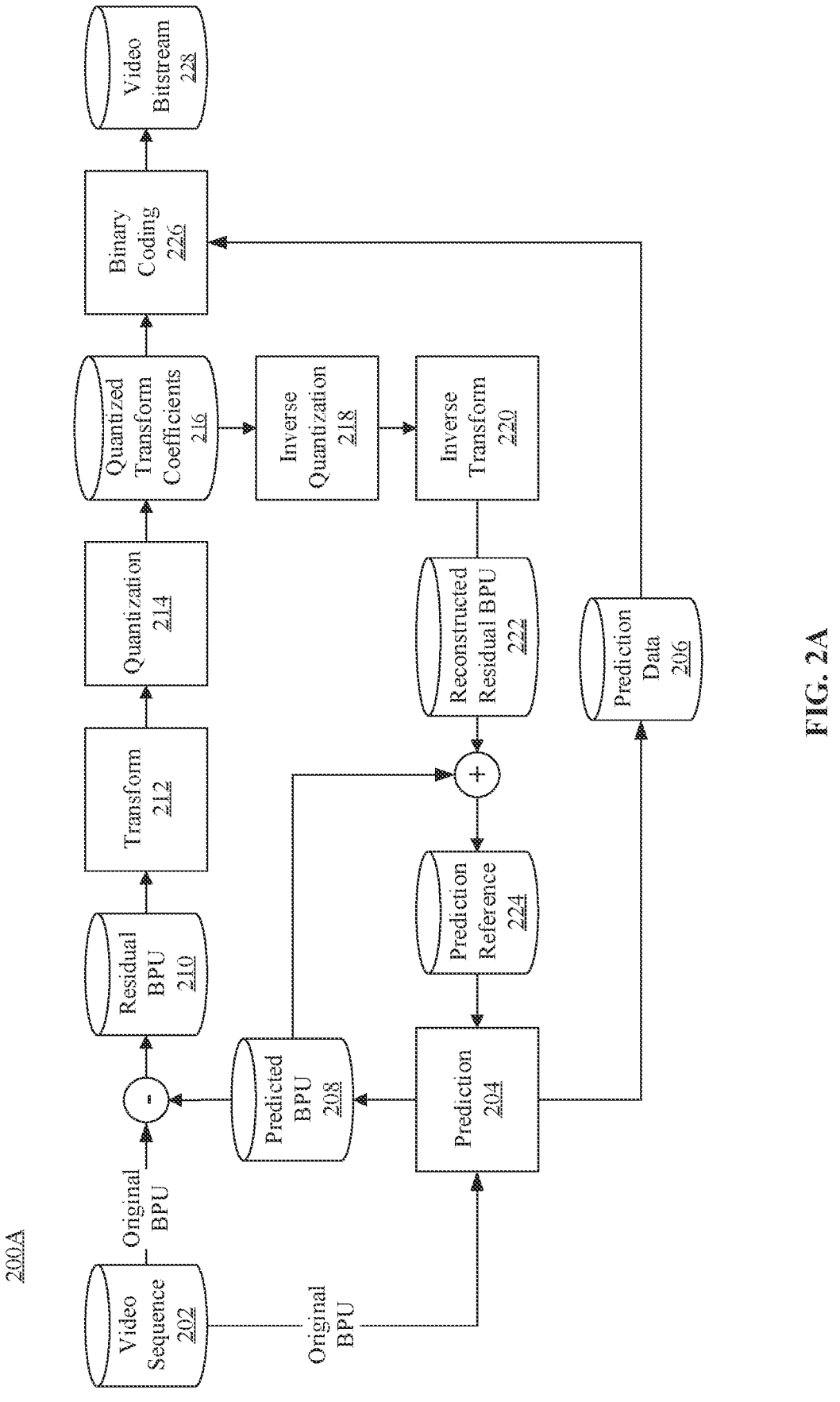
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages.

In some embodiments, process 200A can omit one or more stages in FIG. 2A.

Figure 2B:
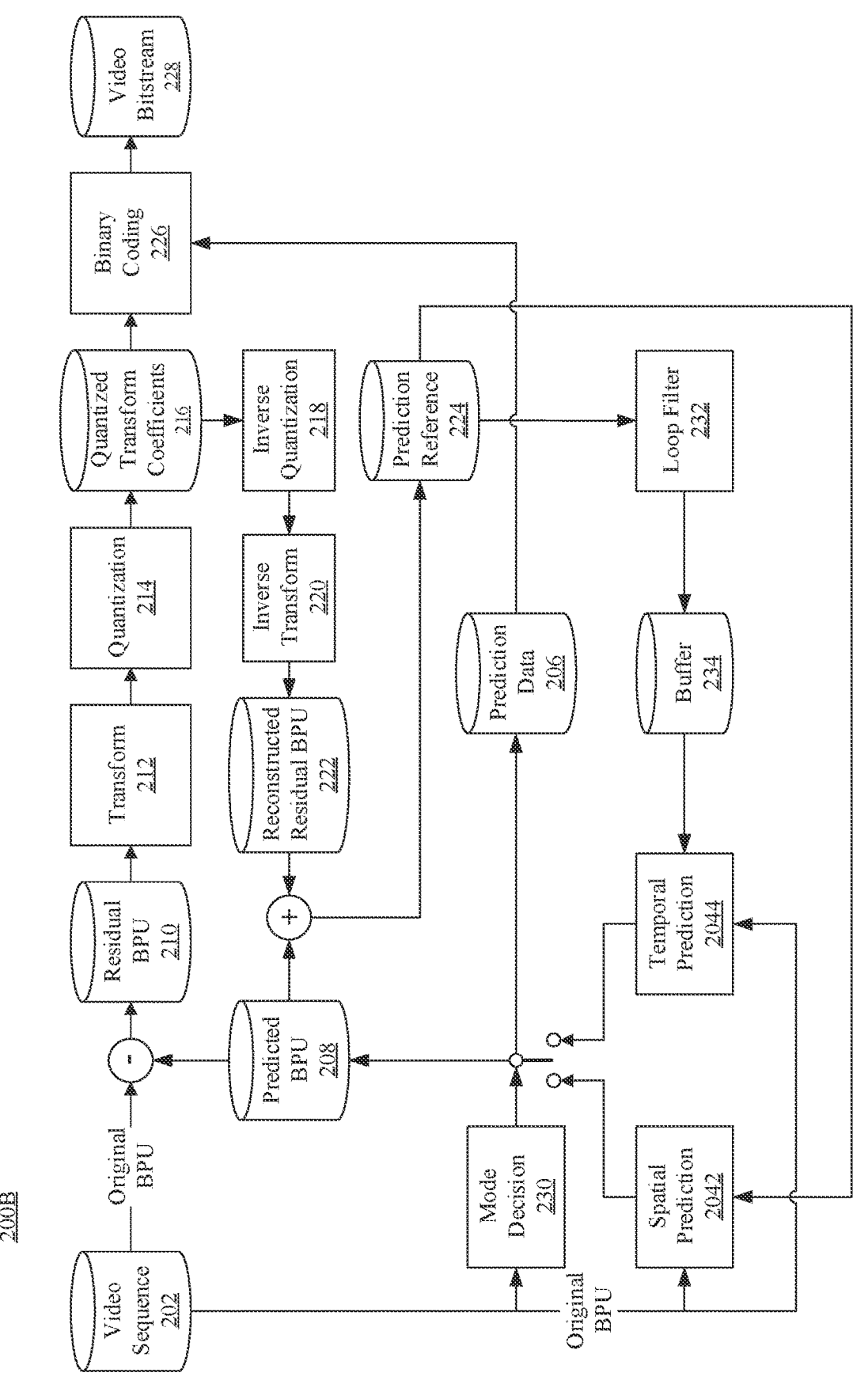
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
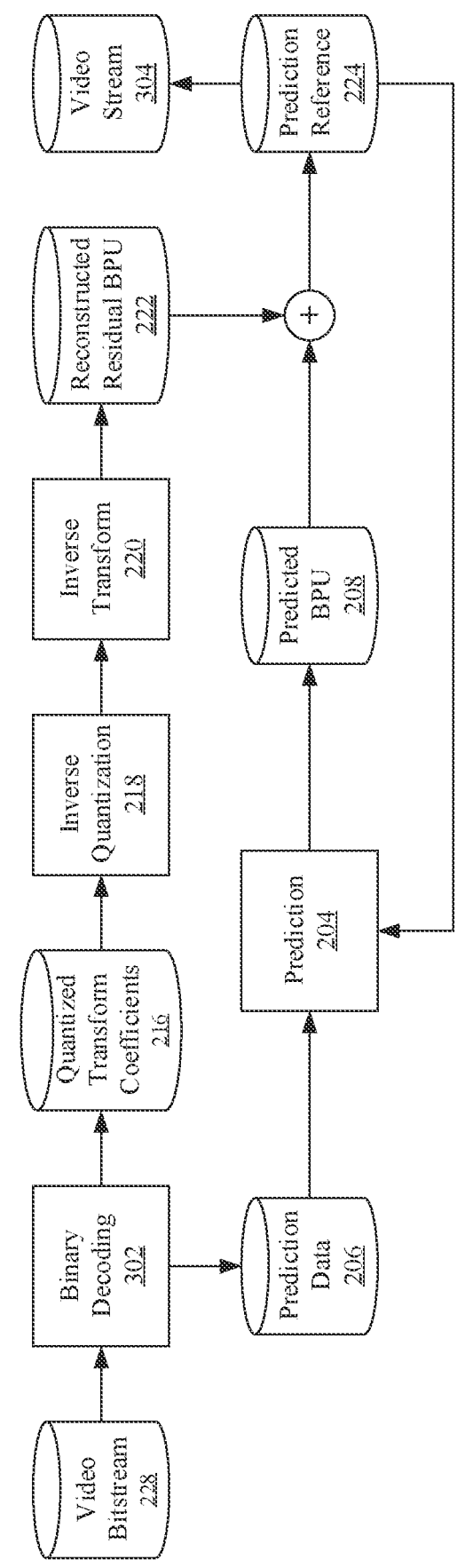
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
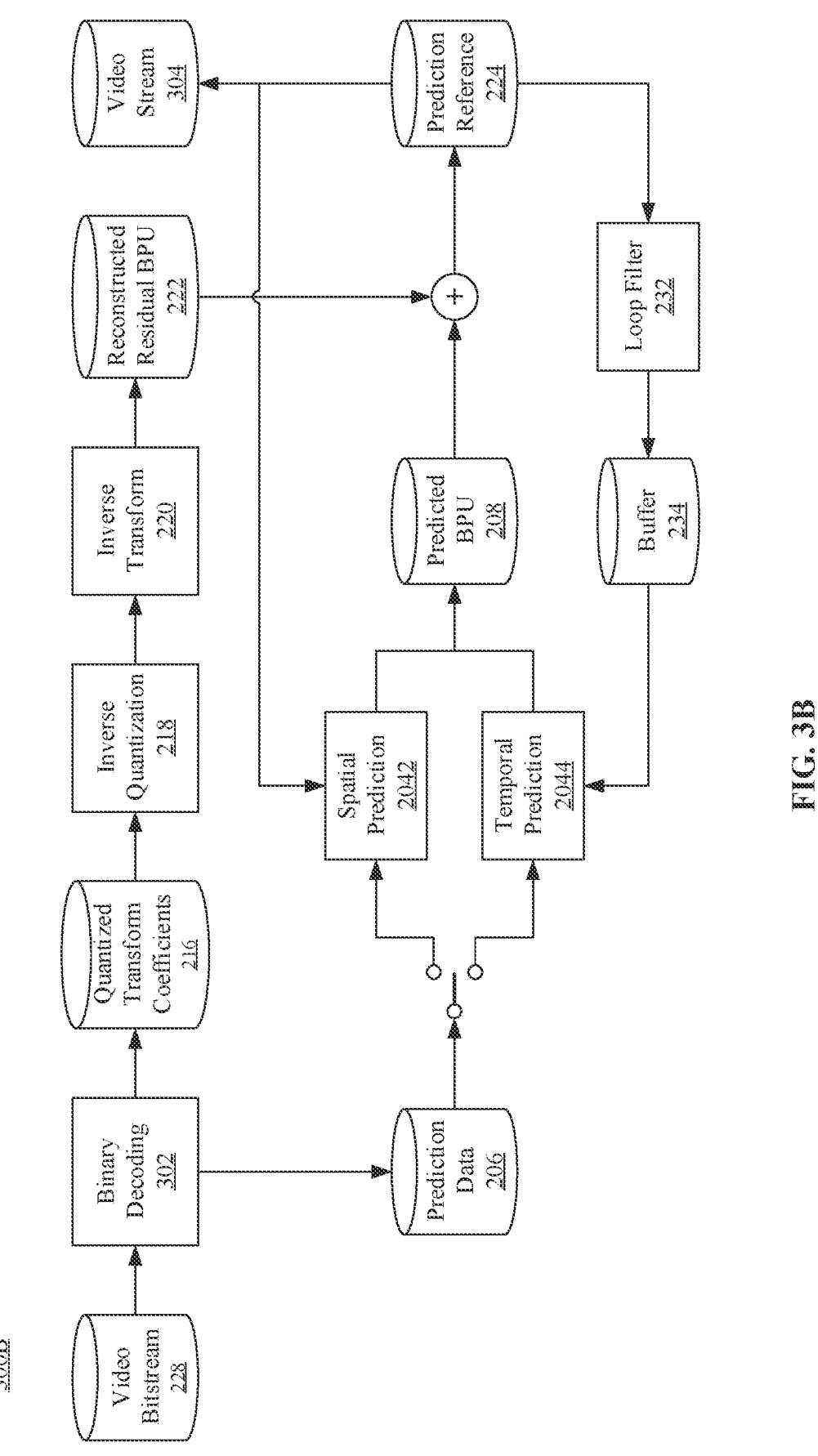
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
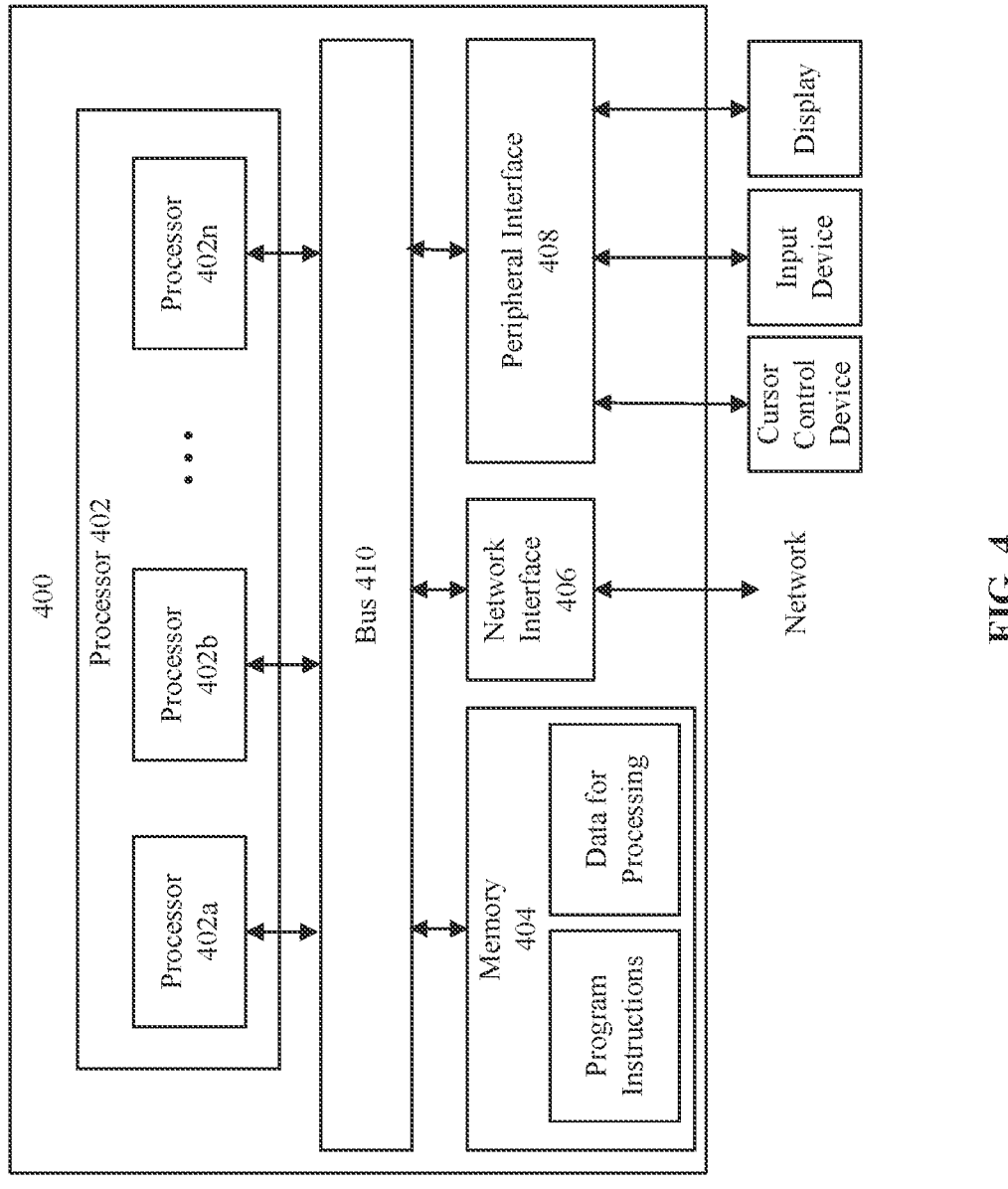
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

SEI messages are intended to be conveyed within coded video bitstream in a manner specified in a video coding specification or to be conveyed by other means determined by the specifications for systems that make use of such coded video bitstream. The video coding specification(s) hereinafter is simplified as specification(s). SEI messages can contain various types of data that indicate the timing of the video pictures or describe various properties of the coded video or how it can be used or enhanced. SEI messages are also defined as containing arbitrary user-defined data. SEI messages do not affect the core decoding process, but can indicate how the video is recommended to be post-processed or displayed.

In some embodiments consistent with the present disclosure, neural network post-filter (NNPF) is used to improve the quality of the decoded video. Accordingly, an NNPF SEI message is used. The NNPF SEI message includes neural network post-filter characteristic (NNPFC) and neural network post-filter activation (NNPFA).

The NNPF SEI message and the semantic information of NNPFC are provided as showing in Table 1 and Table 2.

TABLE 1

| NNPF SEI message syntax | |
|---|---|
| | Descriptor |
| nn_post_filter_characteristics( payloadSize ) { | |
|   nnpfc_id | ue(v) |
|   nnpfc_mode_idc | ue(v) |
|   nnpfc_purpose_and_formatting_flag | u(1) |
|   if( nnpfc_purpose_and_formatting_flag ) { | |
|     nnpfc_purpose | ue(v) |
|     if( nnpfc_purpose = = 2 \| \| nnpfc_purpose = = 4 ) | |
|       nnpfc_out_sub_c_flag | u(1) |
|     if( nnpfc_purpose = = 3 \| \| nnpfc_purpose = = 4 ) { | |
|       nnpfc_pic_width_in_luma_samples | ue(v) |
|       nnpfc_pic_height_in_luma_samples | ue(v) |
|     } | |
|   /* input and output formatting */ | |
|   nnpfc_component_last_flag | u(1) |
|   nnpfc_inp_format_flag | u(1) |
|   if( nnpfc_inp_format_flag = = 1 ) | |
|     nnpfc_inp_tensor_bitdepth_minus8 | ue(v) |
|   nnpfc_inp_order_idc | ue(v) |
|   nnpfc_auxiliary_inp_idc | ue(v) |
|   nnpfc_separate_colour_description_present_flag | u(1) |
|   if( nnpfc_separate_colour_description_present_flag ) { | |
|     nnpfc_colour_primaries | u(8) |
|     nnpfc_transfer_characteristics | u(8) |
|     nnpfc_matrix_coeffs | u(8) |
|   } | |
|   nnpfc_out_format_flag | u(1) |
|   if( nnpfc_out_format_flag = = 1 ) | |
|     nnpfc_out_tensor_bitdepth_minus8 | ue(v) |
|   nnpfc_out_order_idc | ue(v) |
|   nnpfc_constant_patch_size_flag | u(1) |
|   nnpfc_patch_width_minus1 | ue(v) |
|   nnpfc_patch_height_minus1 | ue(v) |
|   nnpfc_overlap | ue(v) |
|   nnpfc_padding_type | ue(v) |
|   if( nnpfc_padding_type = = 4 ){ | |
|     nnpfc_luma_padding_val | ue(v) |
|     nnpfc_cb_padding_val | ue(v) |
|     nnpfc_cr_padding_val | ue(v) |
|   } | |
|   nnpfc_complexity_idc | ue(v) |
|   if( nnpfc_complexity_idc > 0 ) | |
|     nnpfc_complexity_element( nnpfc_complexity_idc ) | |
|   if( nnpfc_mode_idc = = 2 ) { | |
|     while( !byte_aligned( ) ) | |

TABLE 1-continued

| NNPF SEI message syntax | |
|---|---|
| | Descriptor |
|       nnpfc_reserved_zero_bit | u(1) |
|     nnpfc_uri_tag[ i ] | st(v) |
|     nnpfc_uri[ i ] | st(v) |
|    } | |
|  } | |
| /* filter specified or updated by ISO/IEC 15938-17 bitstream */ | |
| if( nnpfc_mode_idc = = 1 ) { | |
|   while( !byte_aligned( ) ) | |
|     nnpfc_reserved_zero_bit | u(1) |
|   for( i = 0; more_data_in_payload( ); i++ ) | |
|     nnpfc_payload_byte[ i ] | b(8) |
|  } | |
| } | |

TABLE 2

| NNPF SEI message syntax | |
|---|---|
| | Descriptor |
| nnpfc_complexity_element( nnpfc_complexity_idc ) { | |
|   if( nnpfc_complexity_idc = = 1 ) { | |
|     nnpfc_parameter_type_idc | u(2) |
|     if (nnpfc_parameter_type_idc ! = 2) | |
|       nnpfc_log2_parameter_bit_length_minus3 | u(2) |
|     nnpfc_num_parameters_idc | u(6) |
|     nnpfc_num_kmac_operations_idc | ue(v) |
|   } | |
| } | |

TABLE 3

| | SubWidthC and SubHeightC values derived from ChromaFormatIdc | | |
|---|---|---|---|
| ChromaFormatIdc | Chroma format | SubWidthC | SubHeightC |
| 0 | Monochrome | 1 | 1 |
| 1 | 4:2:0 | 2 | 2 |
| 2 | 4:2:2 | 2 | 1 |
| 3 | 4:4:4 | 1 | 1 |

Using the NNPF, an SEI message requires the definition of the following variables:

Cropped decoded output picture width and height in units of luma samples, denoted herein by CroppedWidth and CroppedHeight, respectively.

Luma sample array CroppedYPic, and chroma sample arrays CroppedCbPic and CroppedCrPic, when present, of the cropped decoded output picture for vertical coordinates y and horizontal coordinates x, where the top-left corner of each of the sample arrays has coordinates y equal to 0, and x equal to 0.

Bit depth $BitDepth_Y$ for the luma sample array of the cropped decoded output picture.

Bit depth $BitDepth_C$ for the chroma sample arrays, if any, of the cropped decoded output picture.

A chroma format indicator, denoted herein by ChromaFormatIdc.

When nnpfc_auxiliary_inp_idc is equal to 1, a quantization strength value StrengthControlVal.

When the NNPF SEI message specifies a neural network that may be used as a post-processing filter, the semantics specify the derivation of the luma sample array FilteredYPic [x][y] and chroma sample arrays FilteredCbPic[x][y] and FilteredCrPic[x][y], as indicated by the value of nnpfc_out_order_idc, that contain the output of the post-processing filter.

The variables SubWidthC and SubHeightC are derived from ChromaFormatIdc as specified by the following Table 3.

nnpfc_id contains an identifying number that may be used to identify a post-processing filter. The value of nnpfc_id can be in the range of 0 to $2^{32}-2$ (inclusive). Values of nnpfc_id from 256 to 511 (inclusive), and from $2^{31}$ to $2^{32}-2$ (inclusive) are reserved for future use by ITU-T|ISO/JEC. Decoders encountering a value of nnpfc_id in the range of 256 to 511 (inclusive), or in the range of $2^{31}$ to $2^{32}-2$ (inclusive), can ignore it.

nnpfc_mode_idc equal to 0 specifies that the post-processing filter associated with the nnpfc_id value is determined by external means not specified in the current specifications. nnpfc_mode_idc equal to 1 specifies that the post-processing filter associated with the nnpfc_id value is a neural network represented by the ISO/IEC 15938-17 bitstream contained in this SEI message.

nnpfc_mode_idc equal to 2 specifies that the post-processing filter associated with the nnpfc_id value is a neural network identified by a specified tag Uniform Resource Identifier (URI) (nnpfc_uri_tag[i]) and neural network information URI (nnpfc_uri[i]).

The value of nnpfc_mode_idc can be in the range of 0 to 255 (inclusive). Values of nnpfc_mode_idc greater than 2 are reserved for future specification by ITU-T|ISO/JEC and cannot be present in bitstreams conforming to the current specifications. Decoders conforming to the current specifications can ignore SEI messages that contain reserved values of nnpfc_mode_idc.

nnpfc_purpose_and_formatting_flag equal to 0 specifies that no syntax elements related to the filter purpose, input formatting, output formatting, and complexity are present. nnpfc_purpose_and_formatting_flag equal to 1 specifies that syntax elements related to the filter purpose, input formatting, output formatting, and complexity are present.

When nnpfc_mode_idc is equal to 1 and the current CLVS (Coded Layer Video Sequence) does not contain a preceding neural network post-filter characteristics SEI message, in decoding order, that has the value of nnpfc_id equal to the value of nnpfc_id in this SEI message, nnpfc_purpose_and_formatting_flag can be equal to 1.

When the current CLVS contains a preceding neural network post-filter characteristics SEI message, in decoding order, that has the same value of nnpfc_id equal to the value of nnpfc_id in this SEI message, at least one of the following conditions may apply:

This SEI message has nnpfc_mode_idc equal to 1 and nnpfc_purpose_and_formatting_flag equal to 0 in order to provide a neural network update.

This SEI message has the same content as the preceding neural network post-filter characteristics SEI message.

When this SEI message is the first neural network post-filter characteristics SEI message, in decoding order, that has a particular nnpfc_id value within the current CLVS, it specifies a base post-processing filter that pertains to the current decoded picture and all subsequent decoded pictures of the current layer, in output order, until the end of the current CLVS. When this SEI message is not the first neural network post-filter characteristics SEI message, in decoding order, that has a particular nnpfc_id value within the current CLVS, this SEI message pertains to the current decoded picture and all subsequent decoded pictures of the current layer, in output order, until the end of the current CLVS or the next neural network post-filter characteristics SEI message having that particular nnpfc_id value, in output order, within the current CLVS.

nnpfc_purpose indicates the purpose of post-processing filter as specified in Table 4. The value of nnpfc_purpose can be in the range of 0 to $2^{32}-2$ (inclusive). Values of nnpfc_purpose that do not appear in Table 4 are reserved for future specification by ITU-T|ISO/JEC and cannot be present in bitstreams conforming to the current specifications. Decoders conforming to the current specifications can ignore SEI messages that contain reserved values of nnpfc_purpose.

TABLE 4

| Definition of nnpfc_purpose | |
| --- | --- |
| Value | Interpretation |
| 0 | Unknown or unspecified |
| 1 | Visual quality improvement |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |

It is noted that when a reserved value of nnpfc_purpose is taken into use in the future by ITU-T|ISO/JEC, the syntax of this SEI message could be extended with syntax elements whose presence is conditioned by nnpfc_purpose being equal to that value.

When SubWidthC is equal to 1 and SubHeightC is equal to 1, nnpfc_purpose cannot be equal to 2 or 4.

nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1. When nnpfc_out_sub_c_flag is not present, outSubWidthC is inferred to be equal to SubWidthC and outSubHeightC is inferred to be equal to SubHeightC. If SubWidthC is equal to 2 and SubHeightC is equal to 1, nnpfc_out_sub_c_flag cannot be equal to 0.

nnpfc_pic_width_in_luma_samples and nnpfc_pic_height_in_luma_samples specify the width and height, respectively, of the luma sample array of the picture resulting by applying the post-processing filter identified by nnpfc_id to a cropped decoded output picture. When nnpfc_pic_width_in_luma_samples and nnpfc_pic_height_in_luma_samples are not present, they are inferred to be equal to CroppedWidth and CroppedHeight, respectively.

nnpfc_component_last_flag equal to 0 specifies that the second dimension in the input tensor inputTensor to the post-processing filter and the output tensor outputTensor resulting from the post-processing filter is used for the channel. nnpfc_component_last_flag equal to 1 specifies that the last dimension in the input tensor inputTensor to the post-processing filter and the output tensor outputTensor resulting from the post-processing filter is used for the channel.

It is noted that the first dimension in the input tensor and in the output tensor is used for the batch index, which is a practice in some neural network frameworks. While the semantics of this SEI message use batch size equal to 1, it is up to the post-processing implementation to determine the batch size used as input to the neural network inference.

It is noted that a colour component is an example of a channel.

nnpfc_inp_format_flag indicates the method of converting a sample value of the cropped decoded output picture to an input value to the post-processing filter. When nnpfc_inp_format_flag is equal to 0, the input values to the post-processing filter are real numbers and the functions InpY( ) and InpC( ) are specified as follows:

$$InpY(x) = x \div ((1 \ll BitDepth_Y) - 1) \qquad \text{(Definition 1)}$$

$$InpC(x) = x \div ((1 \ll BitDepth_C) - 1) \qquad \text{(Definition 2)}$$

When nnpfc_inp_format_flag is equal to 1, the input values to the post-processing filter are unsigned integer numbers and the functions InpY( ) and InpC( ) are specified as follows:

$$shiftY = BitDepth_Y - inpTensorBitDepth \qquad \text{(Definition 3)}$$

$$if(inpTensorBitDepth >= BitDepth_Y)$$

$$InpY(x) = x \ll (inpTensorBitDepth - BitDepth_Y)$$

$$else$$

$$InpY(x) = Clip3(0, (1 \ll inpTensorBitDepth) - 1,$$

$$(x + (1 \ll (shiftY - 1))) \gg shiftY)$$

$$shiftC = BitDepth_C - inpTensorBitDepth \qquad \text{(Definition 4)}$$

$$if(inpTensorBitDepth >= BitDepth_C)$$

$$InpC(x) = x \ll (inpTensorBitDepth - BItDepth_C)$$

$$else$$

$$InpC(x) = Clip3(0, (1 \ll inpTensorBitDepth) - 1,$$

$$(x + (1 \ll (shiftC - 1))) \gg shiftC)$$

The variable inpTensorBitDepth is derived from the syntax element nnpfc_inp_tensor_bitdepth_minus8 as specified below.

nnpfc_inp_tensor_bitdepth_minus8 plus 8 specifies the bit depth of luma sample values in the input integer tensor. The value of inpTensorBitDepth is derived as follows:

$$inpTensorBitDepth = \text{nnpfc\_inp\_tensor\_bitdepth\_minus8} + 8 \text{ (Definition 5)}$$

It is a requirement of bitstream conformance that the value of nnpfc_inp_tensor_bitdepth_minus8 can be in the range of 0 to 24 (inclusive).

nnpfc_auxiliary_inp_idc not equal to 0 specifies auxiliary input data is present in the input tensor of the neural network post-filter. nnpfc_auxiliary_inp_idc equal to 0 indicates that auxiliary input data is not present in the input tensor. nnpfc_auxiliary_inp_idc equal to 1 specifies that auxiliary input data is derived as specified in the following Table 7. The value of nnpfc_auxiliary_inp_idc can be in the range of 0 to 255 (inclusive). Values of nnpfc_auxiliary_inp_idc greater than 1 are reserved for future specification by ITU-T ISO/JEC and cannot be present in bitstreams conforming to the current specifications. Decoders conforming to the current specifications can ignore SEI messages that contain reserved values of nnpfc_auxiliary_inp_idc.

nnpfc_separate_colour_description_present_flag equal to 1 indicates that a distinct combination of colour primaries, transfer characteristics, and matrix coefficients for the picture resulting from the post-processing filter is specified in the SEI message syntax structure. nnpfc_separate_colour_description_present_flag equal to 0 indicates that the combination of colour primaries, transfer characteristics, and matrix coefficients for the picture resulting from the post-processing filter is the same as indicated in VUI parameters for the CLVS.

nnpfc_colour_primaries has the same semantics specified for the vui_colour_primaries syntax element, except as follows:

nnpfc_colour_primaries specifies the colour primaries of the picture resulting from applying the neural network post-filter specified in the SEI message, rather than the colour primaries used for the CLVS.

When nnpfc_colour_primaries is not present in the neural network post-filter characteristics SEI message, the value of nnpfc_colour_primaries is inferred to be equal to vui_colour_primaries.

nnpfc_transfer_characteristics has the same semantics specified for the vui_transfer_characteristics syntax element, except as follows:

nnpfc_transfer_characteristics specifies the transfer characteristics of the picture resulting from applying the neural network post-filter specified in the SEI message, rather than the transfer characteristics used for the CLVS.

When nnpfc_transfer_characteristics is not present in the neural network post-filter characteristics SEI message, the value of nnpfc_transfer_characteristics is inferred to be equal to vui_transfer_characteristics.

nnpfc_matrix_coeffs has the same semantics specified for the vui_matrix_coeffs syntax element, except as follows:

nnpfc_matrix_coeffs specifies the matrix coefficients of the picture resulting from applying the neural network post-filter specified in the SEI message, rather than the matrix coefficients used for the CLVS.

When nnpfc_matrix_coeffs is not present in the neural network post-filter characteristics SEI message, the value of nnpfc_matrix_coeffs is inferred to be equal to vui_matrix_coeffs.

The values allowed for nnpfc_matrix_coeffs are not constrained by the chroma format of the decoded video pictures that is indicated by the value of ChromaFormatIdc for the semantics of the VUI parameters.

When nnpfc_matrix_coeffs is equal to 0, nnpfc_out_order_idc cannot be equal to 1 or 3.

nnpfc_inp_order_idc indicates the method of ordering the sample arrays of a cropped decoded output picture as the input to the post-processing filter. The following Table 5 contains an informative description of nnpfc_inp_order_idc values. The semantics of nnpfc_inp_order_idc in the range of 0 to 3 (inclusive), are specified in the following Table 7, which specifies a process for deriving the input tensors inputTensor for different values of nnpfc_inp_order_idc and a given vertical sample coordinate cTop and a horizontal sample coordinate cLeft specifying the top-left sample location for the patch of samples included in the input tensors. When the chroma format of the cropped decoded output picture is not 4:2:0, nnpfc_inp_order_idc cannot be equal to 3. The value of nnpfc_inp_order_idc can be in the range of 0 to 255 (inclusive). Values of nnpfc_inp_order_idc greater than 3 are reserved for future specification by ITU-T|ISO/JEC and cannot be present in bitstreams conforming to the current specifications. Decoders conforming to the current specifications can ignore SEI messages that contain reserved values of nnpfc_inp_order_idc.

TABLE 5

Informative description of nnpfc_inp_order_idc values

| nnpfc_inp_order_idc | Description |
| --- | --- |
| 0 | If nnpfc_auxiliary_inp_idc is equal to 0, one luma matrix is present in the input tensor, thus the number of channels is 1. Otherwise, nnpfc_auxiliary_inp_idc is not equal to 0 and one luma matrix and one auxiliary input matrix are present, thus the number of channels is 2. |
| 1 | If nnpfc_auxiliary_inp_idc is equal to 0, two chroma matrices are present in the input tensor, thus the number of channels is 2. Otherwise, nnpfc_auxiliary_inp_idc is not equal to 0 and two chroma matrices and one auxiliary input matrix are present, thus the number of channels is 3. |
| 2 | If nnpfc_auxiliary_inp_idc is equal to 0, one luma and two chroma matrices are present in the input tensor, thus the number of channels is 3. Otherwise, nnpfc_auxiliary_inp_idc is not equal to 0 and one luma matrix, two chroma matrices and one auxiliary input matrix are present, thus the number of channels is 4. |

TABLE 5-continued

Informative description of nnpfc_inp_order_idc values

Figure 5:
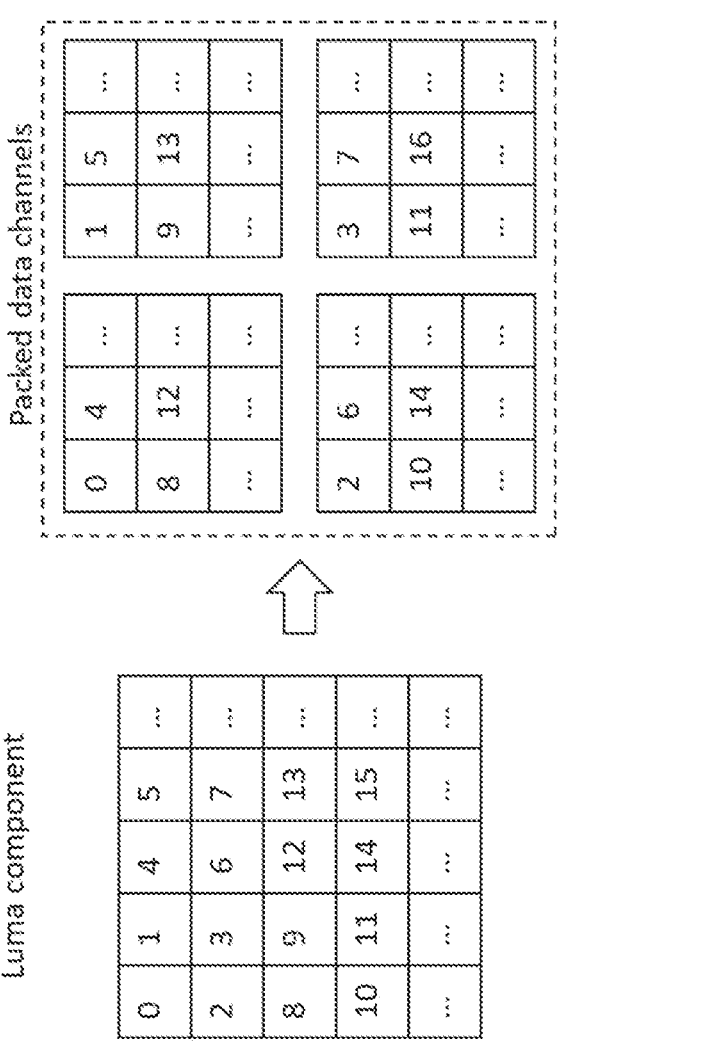
FIG. 5 is a schematic diagram illustrating luma data channels of nnpfc_inp_order_idc equal to 3, according to some embodiments of the present disclosure.

| nnpfc_inp_order_idc | Description |
|---|---|
| 3 | If nnpfc_auxiliary_inp_idc is equal to 0, four luma matrices and two chroma matrices are present in the input tensor, thus the number of channels is 6. Otherwise, nnpfc_auxiliary_inp_idc is not equal to 0 and four luma matrices, two chroma matrices, and one auxiliary input matrix are present in the input tensor, thus the number of channels is 7. The luma channels are derived in an interleaved manner as illustrated in FIG. 5. This nnpfc_inp_order_idc can only be used when the chroma format is 4:2:0. |
| 4 . . . 255 | Reserved |

A patch is a rectangular array of samples from a component (e.g., a luma or chroma component) of a picture.

nnpfc_constant_patch_size_flag equal to 0 specifies that the post-processing filter accepts any patch size that is a positive integer multiple of the patch size indicated by nnpfc_patch_width_minus1 and nnpfc_patch_height_minus1 as input. When nnpfc_constant_patch_size_flag is equal to 0 the patch size width can be less than or equal to CroppedWidth. When nnpfc_constant_patch_size_flag is equal to 0 the patch size height can be less than or equal to CroppedHeight. nnpfc_constant_patch_size_flag equal to 1 specifies that the post-processing filter accepts exactly the patch size indicated by nnpfc_patch_width_minus1 and nnpfc_patch_height_minus1 as input.

nnpfc_patch_width_minus1+1, when nnpfc_constant_patch_size_flag equal to 1, specifies the horizontal sample counts of the patch size required for the input to the post-processing filter. When nnpfc_constant_patch_size_flag is equal to 0, any positive integer multiple of (nnpfc_patch_width_minus1+1) may be used as the horizontal sample counts of the patch size used for the input to the post-processing filter. The value of nnpfc_patch_width_minus1 can be in the range of 0 to Min(32766, CroppedWidth−1) (inclusive).

nnpfc_patch_height_minus1+1, when nnpfc_constant_patch_size_flag equal to 1, specifies the vertical sample counts of the patch size required for the input to the post-processing filter. When nnpfc_constant_patch_size_flag is equal to 0, any positive integer multiple of (nnpfc_patch_height_minus1+1) may be used as the vertical sample counts of the patch size used for the input to the post-processing filter. The value of nnpfc_patch_height_minus1 can be in the range of 0 to Min(32766, CroppedHeight−1) (inclusive).

nnpfc_overlap specifies the overlapping horizontal and vertical sample counts of adjacent input tensors of the post-processing filter. The value of nnpfc_overlap can be in the range of 0 to 16383 (inclusive).

The variables inpPatchWidth, inpPatchHeight, outPatchWidth, outPatchHeight, horCScaling, verCScaling, outPatchCWidth, outPatchCHeight, and overlapSize are derived as follows:

$$inpPatchWidth = \text{nnpfc\_patch\_width\_minus1} + 1 \quad \text{(Definition 6)}$$

$$inpPatchHeight = \text{nnpfc\_patch\_height\_minus1} + 1$$

$$outPatchWidth =$$

$$(\text{nnpfc\_pic\_width\_in\_luma\_samples} * inpPatchWidth)/CroppedWidth$$

-continued $$outPatchHeight =$$

$$(\text{nnpfc\_pic\_height\_in\_luma\_samples} * inpPatchHeight)/CroppedHeight$$

$$horCScaling = SubWidthC/outSubWidthC$$

$$verCScaling = SubHeightC/outSubHeightC$$

$$outPatchCWidth = outPatchWidth * horCScaling$$

$$outPatchCHeight = outPatchHeight * verCScaling$$

$$overlapSize = \text{nnpfc\_overlap}$$

It is a requirement of bitstream conformance that outPatchWidth*CroppedWidth can be equal to nnpfc_pic_width_in_luma_samples*inpPatchWidth and outPatchHeight*CroppedHeight can be equal to nnpfc_pic_height_in_luma_samples*inpPatchHeight.

nnpfc_padding_type specifies the process of padding when referencing sample locations outside the boundaries of the cropped decoded output picture as described in Table 6. The value of nnpfc_padding_type can be in the range of 0 to 15 (inclusive).

TABLE 6

Informative description of nnpfc_padding_type values

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | Reserved | nnpfc_luma_padding_val specifies the luma value to be used for padding when nnpfc_padding_type is equal to 4.

nnpfc_cb_padding_val specifies the Cb value to be used for padding when nnpfc_padding_type is equal to 4.

nnpfc_cr_padding_val specifies the Cr value to be used for padding when nnpfc_padding_type is equal to 4.

The function InpSampleVal(y, x, picHeight, picWidth, croppedPic) with inputs being a vertical sample location y, a horizontal sample location x, a picture height picHeight, a picture width picWidth, and sample array croppedPic returns the value of sampleVal derived as follows:

```
if( nnpfc_padding_type = = 0 )
   if( y < 0 | | x < 0 | | y >= picHeight | | x >= picWidth )
      sampleVal = 0
```

-continued

```
      else
          sampleVal = croppedPic[ x ][ y ]
      else if( nnpfc_padding_type = = 1 )
          sampleVal = croppedPic[ Clip3( 0, picWidth − 1,
              x ) ][ Clip3( 0, picHeight − 1, y ) ]
      else if( nnpfc_padding_type = = 2 )
          sampleVal = croppedPic[ Reflect( picWidth − 1,
              x ) ][ Reflect( picHeight − 1, y ) ]
      else if( nnpfc_padding_type = = 3 )
          if( y >= 0 && y < picHeight )
              sampleVal = croppedPic[ Wrap( picWidth − 1, x ) ][ y ]
```

-continued

```
      else if( nnpfc_padding_type = = 4 )
          if( y < 0 | | x < 0 | | y >= picHeight | | x >= picWidth )
              sampleVal[ 0 ] = nnpfc_luma_padding_val
              sampleVal[ 1 ] = nnpfc_cb_padding_val
              sampleVal[ 2 ] = nnpfc_cr_padding_val
          else
              sampleVal = croppedPic[ x ][ y ]          (Definition 7)
```

The semantics of nnpfc_inp_order_idc in the range of 0 to 3 (inclusive), are specified in the following Table 7.

TABLE 7

Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| 0 | for( yP = −overlapSize; yP < inpPatchHeight + overlapSize; yP++)<br>    for( xP = −overlapSize; xP < inpPatchWidth + overlapSize; xP++ ) {<br>        inpVal = InpY( InpSampleVal( cTop + yP, cLeft + xP, CroppedHeight,<br>            CroppedWidth, CroppedYPic ) )<br>        if( nnpfc_component_last_flag = = 0 )<br>            inputTensor[ 0 ][ 0 ][ yP + overlapSize ][ xP + overlapSize ] = inpVal<br>        else<br>            inputTensor[ 0 ][ yP + overlapSize ][ xP + overlapSize ][ 0 ] = inpVal<br>        if( nnpfc_auxiliary_inp_idc = = 1 )<br>            if( nnpfc_component_last_flag = = 0 )<br>                inputTensor[ 0 ][ 1 ][ yP + overlapSize ][ xP + overlapSize ] =<br>$2^{( StrengthControlVal − 42 ) / 6}$<br>            else<br>                inputTensor[ 0 ][ yP + overlapSize ][ xP + overlapSize ][ 1 ] =<br>$2^{( StrengthControlVal − 42 ) / 6}$<br>        } |
| 1 | for( yP = −overlapSize; yP < inpPatchHeight + overlapSize; yP++)<br>    for( xP = −overlapSize; xP < inpPatchWidth + overlapSize; xP++ ) {<br>        inpCbVal = InpC( InpSampleVal( cTop + yP, cLeft + xP, CroppedHeight /<br>SubHeightC,<br>            CroppedWidth / SubWidthC, CroppedCbPic ) )<br>        inpCrVal = InpC( InpSampleVal( cTop + yP, cLeft + xP, CroppedHeight /<br>SubHeightC,<br>            CroppedWidth / SubWidthC, CroppedCrPic ) )<br>        if( nnpfc_component_last_flag = = 0 ) {<br>            inputTensor[ 0 ][ 0 ][ yP + overlapSize ][ xP + overlapSize ] = inpCbVal<br>            inputTensor[ 0 ][ 1 ][ yP + overlapSize ][ xP + overlapSize ] = inpCrVal<br>        } else {<br>            inputTensor[ 0 ][ yP + overlapSize ][ xP + overlapSize ][ 0 ] = inpCbVal<br>            inputTensor[ 0 ][ yP + overlapSize ][ xP + overlapSize ][ 1 ] = inpCrVal<br>        }<br>        if(nnpfc_auxiliary_inp_idc = = 1)<br>            if( nnpfc_component_last_flag = = 0 )<br>                inputTensor[ 0 ][ 2 ][ yP + overlapSize ][ xP + overlapSize ] =<br>$2^{( StrengthControlVal − 42 ) / 6}$<br>            else<br>                inputTensor[ 0 ][ yP + overlapSize ][ xP + overlapSize ][ 2 ] =<br>$2^{( StrengthControlVal − 42 ) / 6}$<br>        } |
| 2 | for( yP = −overlapSize; yP < inpPatchHeight + overlapSize; yP++)<br>    for( xP = −overlapSize; xP < inpPatchWidth + overlapSize; xP++ ) {<br>        yY = cTop + yP<br>        xY = cLeft + xP<br>        yC = yY / SubHeightC<br>        xC = xY / SubWidthC<br>        inpYVal = InpY( InpSampleVal( yY, xY, CroppedHeight,<br>            CroppedWidth, CroppedYPic ) )<br>        inpCbVal = InpC( InpSampleVal( yC, xC, CroppedHeight / SubHeightC,<br>            CroppedWidth / SubWidthC, CroppedCbPic ) )<br>        inpCrVal = InpC( InpSampleVal( yC, xC, CroppedHeight / SubHeightC,<br>            CroppedWidth / SubWidthC, CroppedCrPic ) )<br>        if( nnpfc_component_last_flag = = 0 ) {<br>            inputTensor[ 0 ][ 0 ][ yP + overlapSize ][ xP + overlapSize ] = inpYVal<br>            inputTensor[ 0 ][ 1 ][ yP + overlapSize ][ xP + overlapSize ] = inpCbVal<br>            inputTensor[ 0 ][ 2 ][ yP + overlapSize ][ xP + overlapSize ] = inpCrVal<br>        } else {<br>            inputTensor[ 0 ][ yP + overlapSize ][ xP + overlapSize ][ 0 ] = inpYVal<br>            inputTensor[ 0 ][ yP + overlapSize ][ xP + overlapSize ][ 1 ] = inpCbVal |

TABLE 7-continued

Process for deriving the input tensors inputTensor for a given vertical sample
coordinate cTop and a horizontal sample coordinate cLeft specifying the top-
left sample location for the patch of samples included in the input tensors nnpfc_inp_order_idc Process DeriveInputTensors( ) for deriving input tensors

```
                              inputTensor[ 0 ][ yP + overlapSize ][ xP + overlapSize ][ 2 ] = inpCrVal
                          }
                          if(nnpfc_auxiliary_inp_idc = = 1)
                              if( nnpfc_component_last_flag = = 0 )
                                  inputTensor[ 0 ][ 3 ][ yP + overlapSize ][ xP + overlapSize ] =
                          2( StrengthControlVal − 42 ) / 6
                              else
                                  inputTensor[ 0 ][ yP + overlapSize ][ xP + overlapSize ][ 3 ] =
  3                       2( StrengthControlVal − 42 ) / 6
                          }
                      for( yP = −overlapSize; yP < inpPatchHeight + overlapSize; yP++)
                          for( xP = −overlapSize; xP < inpPatchWidth + overlapSize; xP++ ) {
                              yTL = cTop + yP * 2
                              xTL = cLeft + xP * 2
                              yBR = yTL + 1
                              xBR = xTL + 1
                              yC = cTop / 2 + yP
                              xC = cLeft / 2 + xP
                              inpTLVal = InpY( InpSampleVal( yTL, xTL, CroppedHeight,
                                  CroppedWidth, CroppedYPic ) )
                              inpTRVal = InpY( InpSampleVal( yTL, xBR, CroppedHeight,
                                  CroppedWidth, CroppedYPic ) )
                              inpBLVal = InpY( InpSampleVal( yBR, xTL, CroppedHeight,
                                  CroppedWidth, CroppedYPic ) )
                              inpBRVal = InpY( InpSampleVal( yBR, xBR, CroppedHeight,
                                  CroppedWidth, CroppedYPic ) )
                              inpCbVal = InpC( InpSampleVal( yC, xC, CroppedHeight / 2,
                                  CroppedWidth / 2, CroppedCbPic ) )
                              inpCrVal = InpC( InpSampleVal( yC, xC, CroppedHeight /2,
                                  CroppedWidth / 2, CroppedCrPic ) )
                              if( nnpfc_component_last_flag = = 0 ) {
                                  inputTensor[ 0 ][ 0 ][ yP + overlapSize ][ xP + overlapSize ] = inpTLVal
                                  inputTensor[ 0 ][ 1 ][ yP + overlapSize ][ xP + overlapSize ] = inpTRVal
                                  inputTensor[ 0 ][ 2 ][ yP + overlapSize ][ xP + overlapSize ] = inpBLVal
                                  inputTensor[ 0 ][ 3 ][ yP + overlapSize ][ xP + overlapSize ] = inpBRVal
                                  inputTensor[ 0 ][ 4 ][ yP + overlapSize ][ xP + overlapSize ] = inpCbVal
                                  inputTensor[ 0 ][ 5 ][ yP + overlapSize ][ xP + overlapSize ] = inpCrVal
                                  inputTensor[ 0 ][ 6 ][ yP + overlapSize ][ xP + overlapSize ] =
                          2( StrengthControlVal − 42) / 6
                              } else {
                                  inputTensor[ 0 ][ yP + overlapSize ][ xP + overlapSize ][ 0 ] = inpTLVal
                                  inputTensor[ 0 ][ yP + overlapSize ][ xP + overlapSize ][ 1 ] = inpTRVal
                                  inputTensor[ 0 ][ yP + overlapSize ][ xP + overlapSize ][ 2 ] = inpBLVal
                                  inputTensor[ 0 ][ yP + overlapSize ][ xP + overlapSize ][ 3 ] = inpBRVal
                                  inputTensor[ 0 ][ yP + overlapSize ][ xP + overlapSize ][ 4 ] = inpCbVal
                                  inputTensor[ 0 ][ yP + overlapSize ][ xP + overlapSize ][ 5 ] = inpCrVal
                              }
                              if(nnpfc_auxiliary_inp_idc = = 1)
                                  if( nnpfc_component_last_flag = = 0 )
                                      inputTensor[ 0 ][ 6 ][ yP + overlapSize ][ xP + overlapSize ] =
                          2( StrengthControlVal − 42) / 6
                                  else
                                      inputTensor[ 0 ][ yP + overlapSize ][ xP + overlapSize ][ 6 ] =
                          2( StrengthControlVal − 42) / 6
                          }
  4 . . . 255           Reserved
``` nnpfc_complexity_idc greater than 0 specifies that one or more syntax elements that indicate the complexity of the post-processing filter associated with the nnpfc_id may be present. nnpfc_complexity_idc equal to 0 specifies that no syntax elements that indicate the complexity of the post-processing filter associated with the nnpfc_id are present. The value nnpfc_complexity_idc can be in the range of 0 to 255 (inclusive). Values of nnpfc_complexity_idc greater than 1 are reserved for future specification by ITU-T|ISO/ JEC and cannot be present in bitstreams conforming to the current specifications. Decoders conforming to the current specifications can ignore SEI messages that contain reserved values of nnpfc_complexity_idc.

nnpfc_out_format_flag equal to 0 indicates that the sample values output by the post-processing filter are real numbers and the functions OutY( ) and OutC( ) for converting luma sample values and chroma sample values, respectively, output by the post-processing, to integer values at bit depths $BitDepth_Y$ and $BitDepth_C$, respectively, are specified as follows:

$$OutY(x) = \text{Clip3}(0, (1 \ll BitDepth_Y) - 1, \qquad \text{(Definition 8)}$$
$$\text{Round}(x * ((1 \ll BitDepth_Y) - 1)))$$

-continued $$OutC(x) = \text{Clip3}(0, (1 \ll BitDepth_C) - 1, \quad \text{(Definition 9)}$$
$$\text{Round}(x * ((1 \ll BitDepth_C) - 1)))$$

nnpfc_out_format_flag equal to 1 indicates that the sample values output by the post-processing filter are unsigned integer numbers and the functions OutY( ) and OutC( ) are specified as follows:

$$shiftY = outTensorBitDepth - BitDepth_Y \quad \text{(Definition 10)}$$
$$\text{if}(shiftY > 0)$$
$$OutY(x) = \text{Clip3}(0, (1 \ll BitDepth_Y) - 1,$$
$$(x + (1 \ll (shiftY - 1))) \gg shiftY))$$
$$\text{else}$$
$$OutY(x) = x \ll (BitDepth_Y - outTensorBitDepth)$$
$$shiftC = outTensorBitDepth - BitDepth_C \quad \text{(Definition 11)}$$
$$\text{if}(shiftC > 0)$$
$$OutC(x) = \text{Clip3}(0, (1 \ll BitDepth_C) - 1,$$
$$(x + (1 \ll (shiftC - 1))) \ll shiftC)$$
$$\text{else}$$
$$OutC(x) = x \ll (BitDepth_C - outTensorBitDepth)$$

The variable outTensorBitDepth is derived from the syntax element nnpfc_out_tensor_bitdepth_minus8 as described below.

nnpfc_out_tensor_bitdepth_minus8 plus 8 specifies the bit depth of sample values in the output integer tensor. The value of outTensorBitDepth is derived as follows:

$$outTensorBitDepth = \quad \text{(Definition 12)}$$
$$\text{nnpfc\_out\_tensor\_bitdepth\_minus8} + 8$$

It is a requirement of bitstream conformance that the value of nnpfc_out_tensor_bitdepth_minus8 can be in the range of 0 to 24 (inclusive).

nnpfc_out_order_idc indicates the output order of samples resulting from the post-processing filter. Table 8 contains an informative description of nnpfc_out_order_idc values. The semantics of nnpfc_out_order_idc in the range of 0 to 3 (inclusive), are specified in Table 9, which specifies a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc cannot be equal to 3. The value of nnpfc_out_order_idc can be in the range of 0 to 255 (inclusive). Values of nnpfc_out_order_idc greater than 3 are reserved for future specification by ITU-T|ISO/JEC and cannot be present in bitstreams conforming to the current specifications. Decoders conforming to the current specifications can ignore SEI messages that contain reserved values of nnpfc_out_order_idc.

TABLE 8

| Informative description of nnpfc_out_order_idc values | |
| --- | --- |
| nnpfc_out_order_idc | Description |
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the chroma format is 4:2:0. |
| 4 . . . 255 | Reserved |

TABLE 9

Process for deriving sample values in the filtered output sample arrays FilteredYPic, FilteredCbPic, and FilteredCrPic from the output tensors outputTensor for a given vertical sample coordinate cTop and a horizontal sample coordinate cLeft specifying the top-left sample location for the patch of samples included in the input tensors

| nnpfc_out_order_idc | Process StoreOutputTensors( ) for deriving sample values in the filtered picture from the output tensors |
| --- | --- |
| 0 | ```
for( yP = 0; yP < outPatchHeight; yP++)
  for( xP = 0; xP < outPatch Width; xP++ ) {
    yY = cTop * outPatchHeight / inpPatchHeight + yP
    xY = cLeft * outPatchWidth / inpPatchWidth + xP
    if ( yY < nnpfc_pic_height_in_luma_samples && xY <
nnpfc_pic_width_in_luma_samples )
      if( nnpfc_component_last_flag = = 0 )
        FilteredYPic[ xY ][yY ] = OutY( outputTensor[ 0 ][ 0 ][ yP ][ xP ] )
      else
        FilteredYPic[ xY ][ yY ] = OutY( outputTensor[ 0 ][ yP ][ xP ][ 0 ] )
    }
``` |
| 1 | ```
for( yP = 0; yP < outPatchCHeight; yP++)
  for( xP = 0; xP < outPatchCWidth; xP++ ) {
    xSrc = cLeft * horCScaling + xP
    ySrc = cTop * verCScaling + yP
    if ( ySrc < nnpfc_pic_height_in_luma_samples / outSubHeightC &&
      xSrc < nnpfc_pic_width_in_luma_samples / outSubWidthC )
``` |

TABLE 9-continued

Process for deriving sample values in the filtered output sample arrays FilteredYPic,
FilteredCbPic, and FilteredCrPic from the output tensors outputTensor for a given
vertical sample coordinate cTop and a horizontal sample coordinate cLeft specifying
the top-left sample location for the patch of samples included in the input tensors

| nnpfc_out_order_idc | Process StoreOutputTensors( ) for deriving sample values in the filtered picture from the output tensors |
|---|---|
| | if( nnpfc_component_last_flag = = 0 ) {<br>    FilteredCbPic[ xSrc ][ ySrc ] = OutC( outputTensor[ 0 ][ 0 ][ yP ][ xP ] )<br>    FilteredCrPic[ xSrc ][ ySrc ] = OutC( outputTensor[ 0 ][ 1 ][ yP ][ xP ] )<br>} else {<br>    FilteredCbPic[ xSrc ][ ySrc ] = OutC( outputTensor[ 0 ][ yP ][ xP ][ 0 ] )<br>    FilteredCrPic[ xSrc ][ ySrc ] = OutC( outputTensor[ 0 ][ yP ][ xP ][ 1 ] )<br>}<br>} |
| 2 | for( yP = 0; yP < outPatchHeight; yP++)<br>  for( xP = 0; xP < outPatchWidth; xP++ ) {<br>    yY = cTop * outPatchHeight / inpPatchHeight + yP<br>    xY = cLeft * outPatchWidth / inpPatchWidth + xP<br>    yC = yY / outSubHeightC<br>    xC = xY / outSubWidthC<br>    yPc =( yP / outSubHeightC ) * outSubHeightC<br>    xPc =( xP / outSubWidthC ) * outSubWidthC<br>    if ( yY < nnpfc_pic_height_in_luma_samples && xY <<br>nnpfc_pic_width_in_luma_samples)<br>      if( nnpfc_component_last_flag = = 0 ) {<br>        FilteredYPic[ xY ][ yY ] = OutY( outputTensor[ 0 ][ 0 ][ yP ][ xP ] )<br>        FilteredCbPic[ xC ][ yC ] = OutC( outputTensor[ 0 ][ 1 ][ yPc ][ xPc ] )<br>        FilteredCrPic[ xC ][ yC ] = OutC( outputTensor[ 0 ][ 2 ][ yPc ][ xPc ] )<br>      } else {<br>        FilteredYPic[ xY ][ yY ] = OutY( outputTensor[ 0 ][ yP ][ xP ][ 0 ] )<br>        FilteredCbPic[ xC ][ yC ] = OutC( outputTensor[ 0 ][ yPc ][ xPc ][ 1 ] )<br>        FilteredCrPic[ xC ][ yC ] = OutC( outputTensor[ 0 ][ yPc ][ xPc ][ 2 ] )<br>      }<br>  } |
| 3 | for( yP = 0; yP < outPatchHeight; yP++ )<br>  for( xP = 0; xP < outPatch Width; xP++ ) {<br>    ySrc = cTop / 2 * outPatchHeight / inpPatchHeight + yP<br>    xSrc = cLeft / 2 * outPatchWidth / inpPatchWidth + xP<br>    if ( ySrc < nnpfc_pic_height_in_luma_samples / 2 &&<br>        xSrc < nnpfc_pic_width_in_luma_samples / 2 )<br>      if( nnpfc_component_last_flag = = 0 ) {<br>        FilteredYPic[ xSrc * 2 ][ ySrc * 2 ] =<br>OutY( outputTensor[ 0 ][ 0 ][ yP ][ xP ] )<br>        FilteredYPic[ xSrc * 2 + 1 ][ ySrc * 2 ] =<br>OutY( outputTensor[ 0 ][ 1 ][ yP ][ xP ] )<br>        FilteredYPic[ xSrc * 2 ][ ySrc * 2 + 1 ] =<br>OutY( outputTensor[ 0 ][ 2 ][ yP ][ xP ] )<br>        FilteredYPic[ xSrc * 2 + 1][ ySrc * 2 + 1 ] =<br>OutY( outputTensor[ 0 ][ 3 ][ yP ][ xP ] )<br>        FilteredCbPic[ xSrc ][ ySrc ] = OutC( outputTensor[ 0 ][ 4 ][ yP ][ xP ] )<br>        FilteredCrPic[ xSrc ][ ySrc ] = OutC( outputTensor[ 0 ][ 5 ][ yP ][ xP ] )<br>      } else {<br>        FilteredYPic[ xSrc * 2 ][ ySrc * 2 ] =<br>OutY( outputTensor[ 0 ][ yP ][ xP ][ 0 ] )<br>        FilteredYPic[ xSrc * 2 + 1 ][ ySrc * 2 ] =<br>OutY( outputTensor[ 0 ][ yP ][ xP ][ 1 ] )<br>        FilteredYPic[ xSrc * 2 ][ ySrc * 2 + 1 ] =<br>OutY( outputTensor[ 0 ][ yP ][ xP ][ 2 ] )<br>        FilteredYPic[ xSrc * 2 + 1][ ySrc * 2 + 1 ] =<br>OutY( outputTensor[ 0 ][ yP ][ xP ][ 3 ] )<br>        FilteredCbPic[ xSrc ][ ySrc ] = OutC( outputTensor[ 0 ][ yP ][ xP ][ 4 ] )<br>        FilteredCrPic[ xSrc ][ ySrc ] = OutC( outputTensor[ 0 ][ yP ][ xP ][ 5 ] )<br>      }<br>  } |
| 4 . . . 255 | Reserved |

A base post-processing filter for a cropped decoded output picture picA is the filter that is identified by the first neural network post-filter characteristics SEI message, in decoding order, that has a particular nnpfc_id value within a CLVS.

If there is another neural network post-filter characteristics SEI message that has the same nnpfc_id value, has nnpfc_mode_idc equal to 1, has different content than the neural network post-filter characteristics SEI message that defines the base post-processing filter, and pertains to the picture picA, the base post-processing filter is updated by decoding the ISO/JEC 15938-17 bitstream in that neural network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter Post-ProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( nnpfc_inp_order_idc == 0 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc == 1 )
  for( cTop = 0; cTop < CroppedHeight / SubHeightC; cTop +=
  inpPatchHeight )
    for( cLeft = 0; cLeft < CroppedWidth / SubWidthC; cLeft +=
    inpPatchWidth ) {
      DeriveInputTensors( )
      outputTensor = PostProcessingFilter( inputTensor )
      StoreOutputTensors( )
    }
else if( nnpfc_inp_order_idc == 2 )
  for( cTop = 0; cTop < CroppedHeight; cTop += inpPatchHeight)
    for( cLeft = 0; cLeft < CroppedWidth; cLeft += inpPatchWidth) {
      DeriveInputTensors( )
      outputTensor = PostProcessingFilter( inputTensor )
      StoreOutputTensors( )
    }
else if( nnpfc_inp_order_idc == 3 )
  for( cTop = 0; cTop < CroppedHeight; cTop += inpPatchHeight * 2 )
    for( cLeft = 0; cLeft < CroppedWidth; cLeft +=
    inpPatchWidth * 2 ) {
      DeriveInputTensors( )
      outputTensor = PostProcessingFilter( inputTensor )
      StoreOutputTensors( )
    }                          (Definition 13)
``` nnpfc_reserved_zero_bit can be equal to 0.

nnpfc_uri_tag[i] contains a NULL-terminated UTF-8 character string specifying a tag URI. The UTF-8 character string can contain a URI, with syntax and semantics as specified in IETF RFC 4151, uniquely identifying the format and associated information about the neural network used as the post-processing filter specified by nnrpf_uri[i] values.

It is noted that nnrpf_uri_tag[i] elements represent a 'tag' URI, which enables uniquely identifying the format of neural network data specified by nnrpf_uri[i] values without needing a central registration authority.

nnpfc_uri[i] can contain a NULL-terminated UTF-8 character string, as specified in ISO/IEC 10646. The UTF-8 character string can contain a URI, with syntax and semantics as specified in IETF Internet Standard 66, identifying the neural network information (e.g. data representation) used as the post-processing filter.

nnpfc_payload_byte[i] contains the i-th byte of a bitstream conforming to ISO/IEC 15938-17. The byte sequence nnpfc_payload_byte[i] for all present values of i can be a complete bitstream that conforms to ISO/IEC 15938-17.

nnpfc_parameter_type_idc equal to 0 indicates that the neural network uses only integer parameters. nnpfc_parameter_type_flag equal to 1 indicates that the neural network may use floating point or integer parameters. nnpfc_parameter_type_idc equal to 2 indicates that the neural network uses only binary parameters. nnpfc_parameter_type_idc equal to 3 is reserved for future specification by ITU-T|ISO/JEC and cannot be present in bitstreams conforming to the current specifications. Decoders conforming to the current specifications can ignore SEI messages that contain reserved value of nnpfc_parameter_type_idc.

nnpfc_log2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log2_parameter_bit_length_minus3 is not present the neural network does not use parameters of bit length greater than 1.

nnpfc_num_parameters_idc indicates the maximum number of neural network parameters for the post processing filter in units of a power of 2048. nnpfc_num_parameters_idc equal to 0 indicates that the maximum number of neural network parameters is not specified. The value nnpfc_num_parameters_idc can be in the range of 0 to 52 (inclusive). Values of nnpfc_num_parameters_idc greater than 52 are reserved for future specification by ITU-T|ISO/JEC and cannot be present in bitstreams conforming to the current specifications. Decoders conforming to the current specifications can ignore SEI messages that contain reserved values of nnpfc_num_parameters_idc.

If the value of nnpfc_num_parameters_idc is greater than zero, the variable maxNumParameters is derived as follows:

$$\text{max}NumParameters = \qquad\qquad (\text{Definition } 14)$$

$$(2048 \ll \text{nnpfc\_num\_parameters\_idc}) - 1$$

It is a requirement of bitstream conformance that the number of neural network parameters of the post-processing filter can be less than or equal to maxNumParameters.

nnpfc_num_kmac_operations_idc greater than 0 specifies that the maximum number of multiply-accumulate operations per sample of the post-processing filter is less than or equal to nnpfc_num_kmac_operations_idc*1000. nnpfc_num_kmac_operations_idc equal to 0 specifies that the maximum number of multiply-accumulate operations of the network is not specified. The value of nnpfc_num_kmac_operations_idc can be in the range of 0 to $2^{32}-1$ (inclusive).

The SEI message and the semantic information of NNPFA are shown as follows in Table 10:

TABLE 10

| NNPFA syntax | |
| --- | --- |
| | Descriptor |
| nn_post_filter_activation( payloadSize ) { | |
| nnpfa_id | ue(v) |
| } | |

This SEI message specifies the neural network post-processing filter that may be used for post-processing filtering for the current picture.

The neural network post-processing filter activation SEI message persists only for the current picture.

It is noted that there can be several neural network post-processing filter activation SEI messages present for the same picture, for example, when the post-processing filters are meant for different purposes or filter different colour components.

nnpfa_id specifies that the neural network post-processing filter specified by one or more neural network post-processing filter characteristics SEI messages that pertain to the current picture and have nnpfc_id equal to nnfpa_id may be used for post-processing filtering for the current picture.

Despite the above-described features of the SEI design for NNPFC, the temporal upsampling towards machine vision is not considered as part of neural network post-filter methods, according to the existing SEI. As such, new characteristics are added to the NNPFC messages for the temporal upsampling for machine vision, according to some embodiments consistent with the present disclosure.

Figure 6:
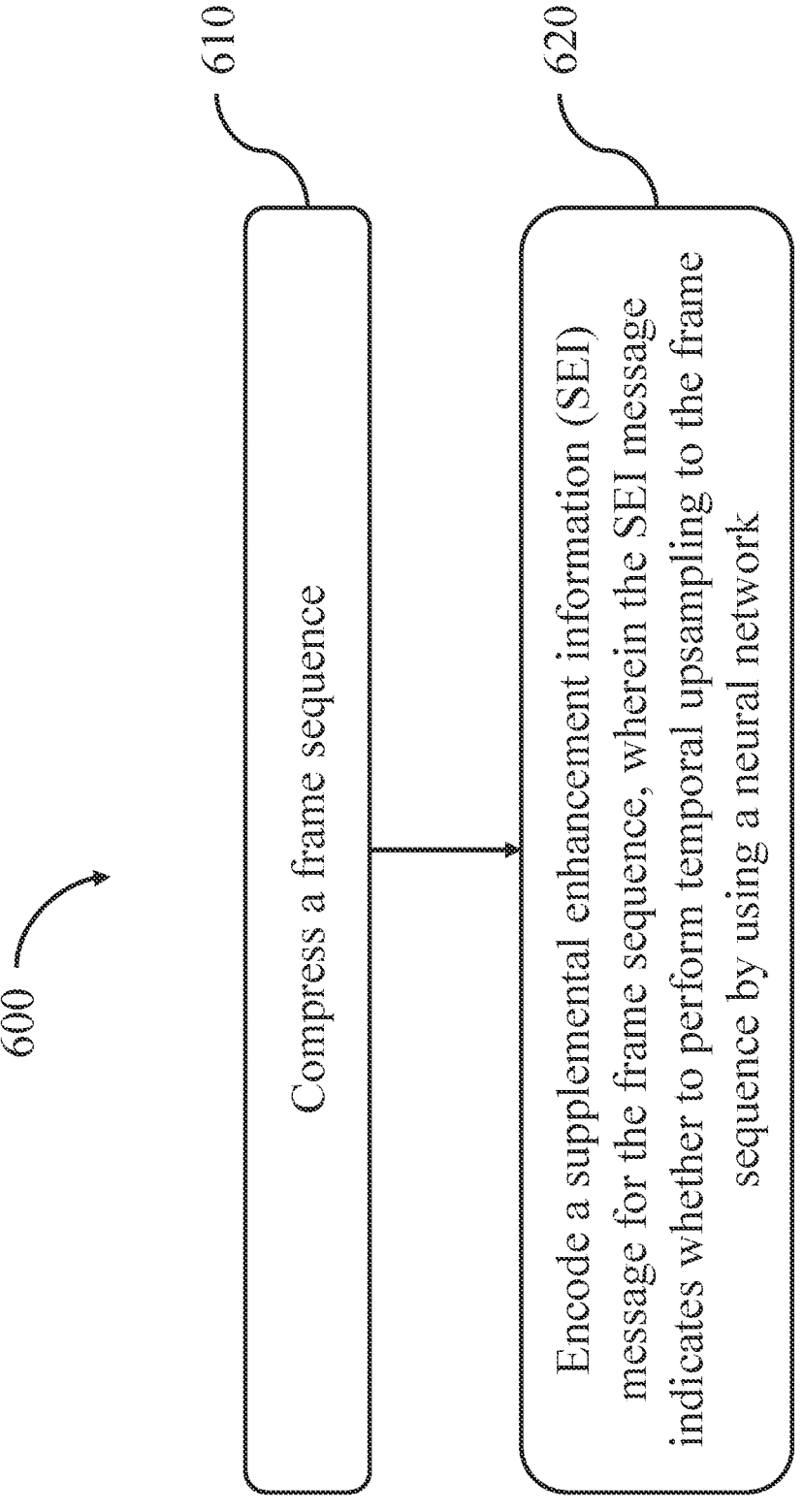
FIG. 6 illustrates a flowchart of an exemplary method for encoding video data, according to some embodiments of the present disclosure.

FIG. 6 illustrates a flowchart of an exemplary method 600 for encoding video data, according to some embodiments of the present disclosure. For example, method 600 may be performed by one or more processors associated with an encoder, such as image/video encoder 124 (FIG. 1). In some embodiments, image/video encoder 124 may be integrated into apparatus 400 shown in FIG. 4, such that method 600 can be performed by apparatus 400. In some other examples, method 600 may be performed by an encoder that is simulated by a general purpose processing unit and necessarily auxiliary components. In this situation, the encoder is implemented as an application or program for the users. As shown in FIG. 6, method 600 includes the following steps 610 and 620.

At step 610, the encoder compresses a frame sequence. Specifically, the encoder may compress the frames within the frame sequence according to Advanced Video Coding (AVC), High Efficiency Video Coding (HEVC), Versatile Video Coding (VVC) or other video standards. The compression scheme for the frame sequence may follow specifications according to these standards. In some embodiments, the frame sequence may be compressed with a low frame rate when the encoder determines that the motions between scenarios of adjacent frames are minor.

At step 620, the encoder encodes a supplemental enhancement information (SEI) message for the frame sequence, wherein the SEI message indicates whether to perform temporal upsampling to the frame sequence by using a neural network. Temporal upsampling, also known as frame interpolation, can be used to improve the smoothness between adjacent frames. The decoder, when receiving the SEI message indicating performing temporal upsampling, can conduct temporal upsampling to the reconstructed frames. In some embodiments, the decoder can determine how to conduct temporal upsampling based on the differences between adjacent frame, for example. In some embodiments, the decoder can conduct temporal upsampling based on the suggestions included in the SEI message from the encoder.

In some embodiments, Table 11 and Table 12 provide an NNPFC SEI message (or simplified as SEI message) for the temporal upsampling for machine vision, which can be adopted by the encoder.

TABLE 11

Syntax of NNPFC SEI message for machine vision

| | Descriptor |
|---|---|
| nn_post_filter_characteristics( payloadSize ) { | |
|   nnpfc_id | ue(v) |
|   nnpfc_mode_idc | ue(v) |
|   nnpfc_purpose_and_formatting_flag | u(1) |
|   if( nnpfc_purpose_and_formatting_flag ) { | |
|     nnpfc_purpose | ue(v) |
|     if( nnpfc_purpose = = 2 \| \| nnpfc_purpose = = 4 ) | |
|       nnpfc_out_sub_c_flag | u(1) |
|   if( nnpfc_purpose = = 3 \| \| nnpfc_purpose = = 4 ) { | |
|     nnpfc_pic_width_in_luma_samples | ue(v) |
|     nnpfc_pic_height_in_luma_samples | ue(v) |
|   } | |
|   if(nnpfc_purpose = = 5){ | |

TABLE 11-continued

Syntax of NNPFC SEI message for machine vision

| | Descriptor |
|---|---|
|   nnpfc_temp_factor | ue(v) |
|   nnpfc_temp_strength | ue(v) |
|   if(nnpfc_temp_strength == 0){ | |
|     nnpfc_inp_range | ue(v) |
|   } | |
| } | |
| /* input and output formatting */ | |
|   nnpfc_component_last_flag | u(1) |
|   nnpfc_inp_format_flag | u(1) |
|   if( nnpfc_inp_format_flag = = 1 ) | |
|     nnpfc_inp_tensor_bitdepth_minus8 | ue(v) |
|   nnpfc_inp_order_idc | ue(v) |
|   nnpfc_auxiliary_inp_idc | ue(v) |
|   nnpfc_separate_colour_description_present_flag | u(1) |
|   if( nnpfc_separate_colour_description_present_flag ) { | |
|     nnpfc_colour_primaries | u(8) |
|     nnpfc_transfer_characteristics | u(8) |
|     nnpfc_matrix_coeffs | u(8) |
|   } | |
|   nnpfc_out_format_flag | u(1) |
|   if( nnpfc_out_format_flag = = 1 ) | |
|     nnpfc_out_tensor_bitdepth_minus8 | ue(v) |
|   nnpfc_out_order_idc | ue(v) |
|   nnpfc_constant_patch_size_flag | u(1) |
|   nnpfc_patch_width_minus1 | ue(v) |
|   nnpfc_patch_height_minus1 | ue(v) |
|   nnpfc_overlap | ue(v) |
|   nnpfc_padding_type | ue(v) |
|   if( nnpfc_padding_type = = 4 ){ | |
|     nnpfc_luma_padding_val | ue(v) |
|     nnpfc_cb_padding_val | ue(v) |
|     nnpfc_cr_padding_val | ue(v) |
|   } | |
|   nnpfc_complexity_idc | ue(v) |
|   if( nnpfc_complexity_idc > 0 ) | |
|     nnpfc_complexity_element( nnpfc_complexity_idc ) | |
|   if( nnpfc_mode_idc = = 2 ) { | |
|     while( !byte_aligned( ) ) | |
|       nnpfc_reserved_zero_bit | u(1) |
|     nnpfc_uri_tag[ i ] | st(v) |
|     nnpfc_uri[ i ] | st(v) |
|   } | |
| } | |
| /* filter specified or updated by ISO/IEC 15938-17 bitstream */ | |
| if( nnpfc_mode_idc = = 1 ) { | |
|   while( !byte_aligned( ) ) | |
|     nnpfc_reserved_zero_bit | u(1) |
|   for( i = 0; more_data_in_payload( ); i++ ) | |
|     nnpfc_payload_byte[ i ] | b(8) |
| } | |
| } | |

TABLE 12

Syntax of NNPFC SEI message for machine vision

| | Descriptor |
|---|---|
| nnpfc_complexity_element( nnpfc_complexity_idc ) { | |
|   if( nnpfc_complexity_idc = = 1 ) { | |
|     nnpfc_parameter_type_idc | u(2) |
|     if (nnpfc_parameter_type_idc != 2) | |
|       nnpfc_log2_parameter_bit_length_minus3 | u(2) |
|     nnpfc_num_parameters_idc | u(6) |
|     nnpfc_num_kmac_operations_idc | ue(v) |
|   } | |
| } | |

The semantics of the NNPFC SEI message for machine vision are described below. This SEI message specifies a neural network that may be used as a temporal resampling filter. The use of temporal resampling filters for specific video sequence is indicated with neural network post-filter activation SEI messages.

nnpfc_purpose indicates the purpose of post-processing filter as specified in Table 13. The value of nnpfc_purpose can be in the range of 0 to $2^{32}-2$ (inclusive). Values of nnpfc_purpose that do not appear in Table 13 can be reserved for future specification may be not present in bitstreams conforming to the current specifications. Decoders conforming to the current specifications can ignore SEI messages that contain reserved values of nnpfc_purpose.

TABLE 13

Definition of nnpfc_purpose

| Value | Interpretation |
|---|---|
| 0 | Unknown or unspecified |
| 1 | Visual quality improvement |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |
| 5 | Perform the temporal upsampling to improve the machine vision performance |

Figures 7, 8, 9:
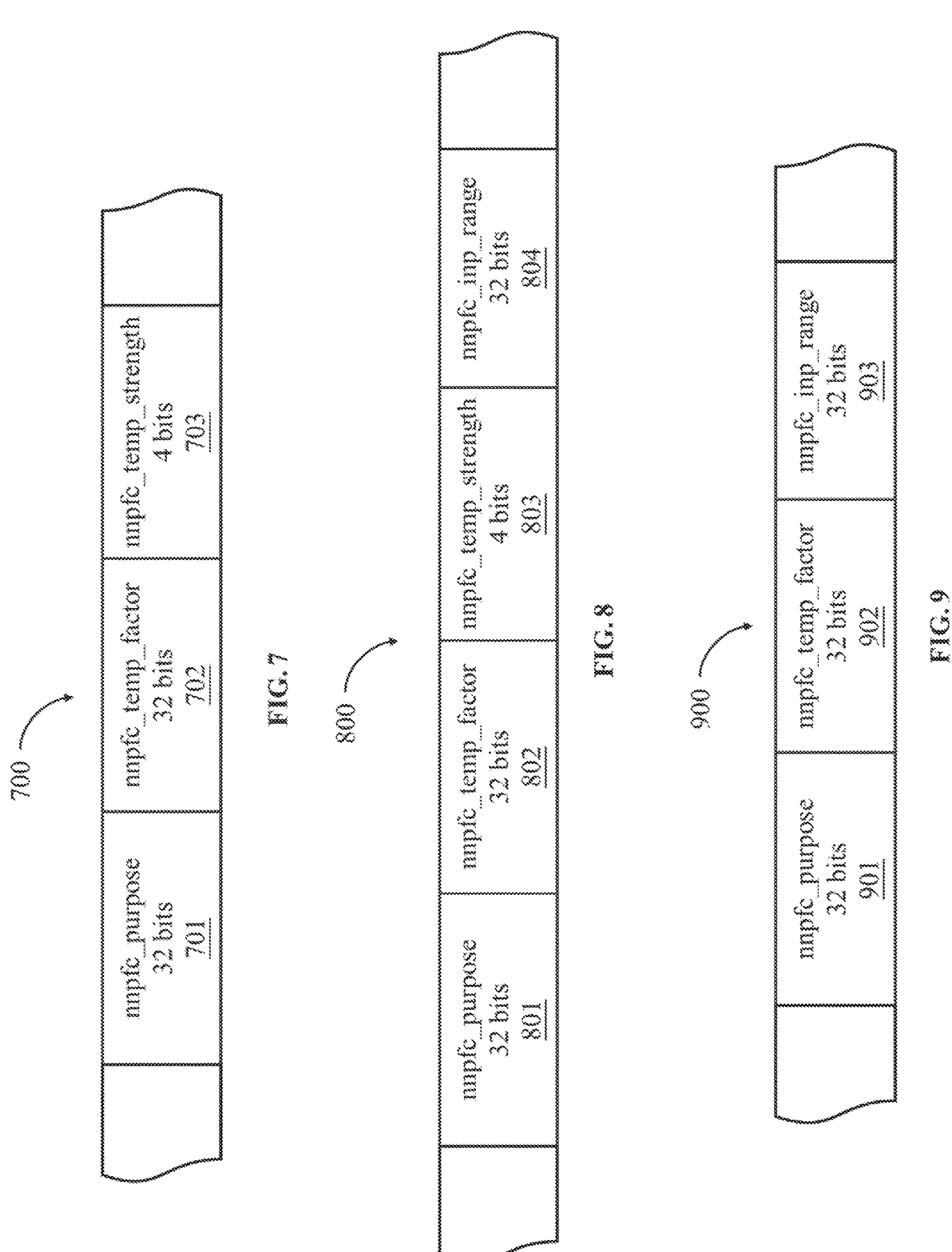
FIG. 7 is a schematic diagram illustrating an exemplary segment of SEI message, according to some embodiments of the present disclosure.
FIG. 8 is a schematic diagram illustrating another exemplary segment of SEI message, according to some embodiments of the present disclosure.
FIG. 9 is a schematic diagram illustrating another exemplary segment of SEI message, according to some embodiments of the present disclosure.

FIG. 7 is a schematic diagram illustrating an exemplary segment of SEI message 700, according to some embodiments of the present disclosure. SEI message 700, which is generated by the encoder, includes three indicators: (1) nnpfc_purpose 701 for indicating whether to perform temporal upsampling to the frame sequence by using a neural network; (2) nnpfc_temp_factor 702 for indicating the upsampling number; and (3) nnpfc_temp_strength 703 for indicating an upsampling strength describing a relationship between the upsampling number and the referencing range. In some embodiments, the referencing range can be conveyed by nnpfc_temp_factor 702 and nnpfc_temp_strength 703.

With further reference to Table 11 and Table 13, nnpfc_purpose (e.g., nnpfc_purpose 701 shown in FIG. 7) within the SEI message can be used to indicate whether to perform temporal upsampling to the frame sequence by using the neural network. Specifically, the encoder may instruct the decoder to perform temporal upsampling by setting a value of the indicator nnpfc_purpose to 5. When the value of the indicator nnpfc_purpose is otherwise set (e.g., 1, 2, 3, or 4), the decoder does not conduct a temporal upsampling towards the reconstructed frame sequence. In some embodiments, the value of the indicator nnpfc_purpose can be greater than 5, which is used for indicating other purposes and not described here. In some embodiments, as shown in FIG. 7, nnpfc_purpose 701 can be encoded with 32 bits.

As also shown in Table 11, the SEI message indicates an upsampling number and a referencing range showing how to perform temporal upsampling to the frame sequence by using the neural network. At the decoder side, the neural network can interpolate the upsampling number of frames between two adjacent frames of the frame sequence by referencing frames within the referencing range. Nnpfc_temp_factor (e.g., nnpfc_temp_factor 702 shown in FIG. 7) indicates the temporal upsampling factor in a range from 1 to $2^{32}-1$ (inclusive), which means the upsampled frame number between a previous frame and a current decoded (reconstructed) frame at the decoder side. In some embodiments, as shown in FIG. 7, nnpfc_temp_factor 702 can be encoded with 32 bits.

For example, if nnpfc_temp_factor is 2 and the current decoded (reconstructed) frame index is i, the decoder can interpolate 2 frames between the decoded frame i−1 and the decoded frame ii by means of the temporal upsampling model, when receiving SEI message 700.

As also shown in Table 11, nnpfc_temp_strength (e.g., nnpfc_temp_strength 703 shown in FIG. 7) indicates the temporal resampling strength in a range from 0 to 15. The temporal resampling strength defines the relationship between the temporal upsampling factor (e.g., nnpfc_temp_factor 702 shown in FIG. 7) and the input frame range of the temporal upsampling network, which is denoted as NumInputTem. As such, the referencing range can be determined based on nnpfc_temp_factor 702 and nnpfc_temp_strength 703 at the decoder side.

Specifically,
NumInputTem=nnpfc_temp_strength*nnpfc_temp_factor,
if nnpfc_temp_strength is not equal to 0. Alternatively,
NumInputTem=(nnpfc_temp_strength+1)*nnpfc_temp_factor, by which nnpfc_temp_strength can be equal to 0. In some embodiments, as shown in FIG. 7, nnpfc_temp_strength 703 can be encoded with 4 bits.

For example, if NumInputTem is 2 and the current frame index is i, the input frame indexes to the temporal upsampling network for reference can be i−1, i−2, i and i+1 in a bidirectional reference scheme. It can be concluded here that NumInputTem can be determined based on nnpfc_temp_factor 702 and nnpfc_temp_strength 703, and thus the three indicators in SEI message 700 are sufficient to perform temporal upsampling towards the reconstructed frame sequence.

FIG. 8 is a schematic diagram illustrating an exemplary segment of SEI message 800, according to some embodiments of the present disclosure. SEI message 800, which is generated by the encoder, includes four indicators: (1) nnpfc_purpose 801 for indicating whether to perform temporal upsampling to the frame sequence by using a neural network; (2) nnpfc_temp_factor 802 for indicating the upsampling number; (3) nnpfc_temp_strength 803 for indicating an upsampling strength describing a relationship between the upsampling number and the referencing range; and (4) nnpfc_inp_range 804 for indicating the referencing range directly. As such, the referencing range can be conveyed by (A) nnpfc_temp_factor 802 and nnpfc_temp_strength 803, or (B) nnpfc_inp_range 804 directly.

The indicators nnpfc_purpose 801, nnpfc_temp_factor 802, and nnpfc_temp_strength 803 can be defined similar to nnpfc_purpose 701, nnpfc_temp_factor 702, and nnpfc_temp_strength 703 shown in FIG. 7, respectively.

In some embodiments, as also shown in Table 11, nnpfc_inp_range (e.g., nnpfc_inp_range 804 shown in FIG. 8) indicates the bidirectional input range of the reconstructed frames for the temporal upsampling network in a range from 1 to $2^{32}-1$ (inclusive). In some embodiments, the referencing range can be determined based on nnpfc_temp_factor 802 and nnpfc_temp_strength 803 at the decoder side. Specifically,
NumInputTem=nnpfc_temp_strength*nnpfc_temp_factor,
if nnpfc_temp_strength is not equal to 0. In some embodiments, nnpfc_inp_range can be utilized as NumInputTem if and only if nnpfc_temp_strength is equal to 0. In some embodiments, as shown in FIG. 8, nnpfc_inp_range 804 can be encoded with 32 bits.

FIG. 9 is a schematic diagram illustrating an exemplary segment of SEI message 900, according to some embodiments of the present disclosure. SEI message 900, which is generated by the encoder, includes three indicators: (1) nnpfc_purpose 901 for indicating whether to perform temporal upsampling to the frame sequence by using a neural network; (2) nnpfc_temp_factor 902 for indicating the upsampling number; and (3) nnpfc_inp_range 903 for indicating the referencing range. At such, the referencing range can be conveyed by nnpfc_inp_range 903 directly.

The indicators nnpfc_purpose 901, nnpfc_temp_factor 902, and nnpfc_inp_range 903 can be defined similar to nnpfc_purpose 801, nnpfc_temp_factor 802, and nnpfc_inp_range 804 shown in FIG. 8, respectively.

In some embodiments, nnpfc_inp_range (e.g., nnpfc_inp_range 903 shown in FIG. 9) indicates the bidirectional input range of the reconstructed frames for the temporal upsampling network in a range from 1 to $2^{32}-1$ (inclusive). In some embodiments, there is a constraint for nnpfc_inp_range and nnpfc_temp_factor, which is $16 \geq$ nnpfc_inp_range/nnpfc_temp_factor$\geq \frac{1}{16}$. It can be concluded here that NumInputTem can be determined based on nnpfc_inp_range 903, and thus the three indicators in SEI message 900 are sufficient to perform temporal upsampling towards the reconstructed frame sequence.

The encoded frame sequence by one or more of the above embodiments can be stored or transmitted to the decoder side for processing. In some embodiments, the encoder may generate the frame sequence without considering how the decoder is implemented. That is, the encoding side and decoding side are separately designed according to a common specification, and may put no limitations to each other. It is to be noted that, although the indicators within the SEI messages are shown next to each other, they can be separately included in the SEI messages.

Figure 10:
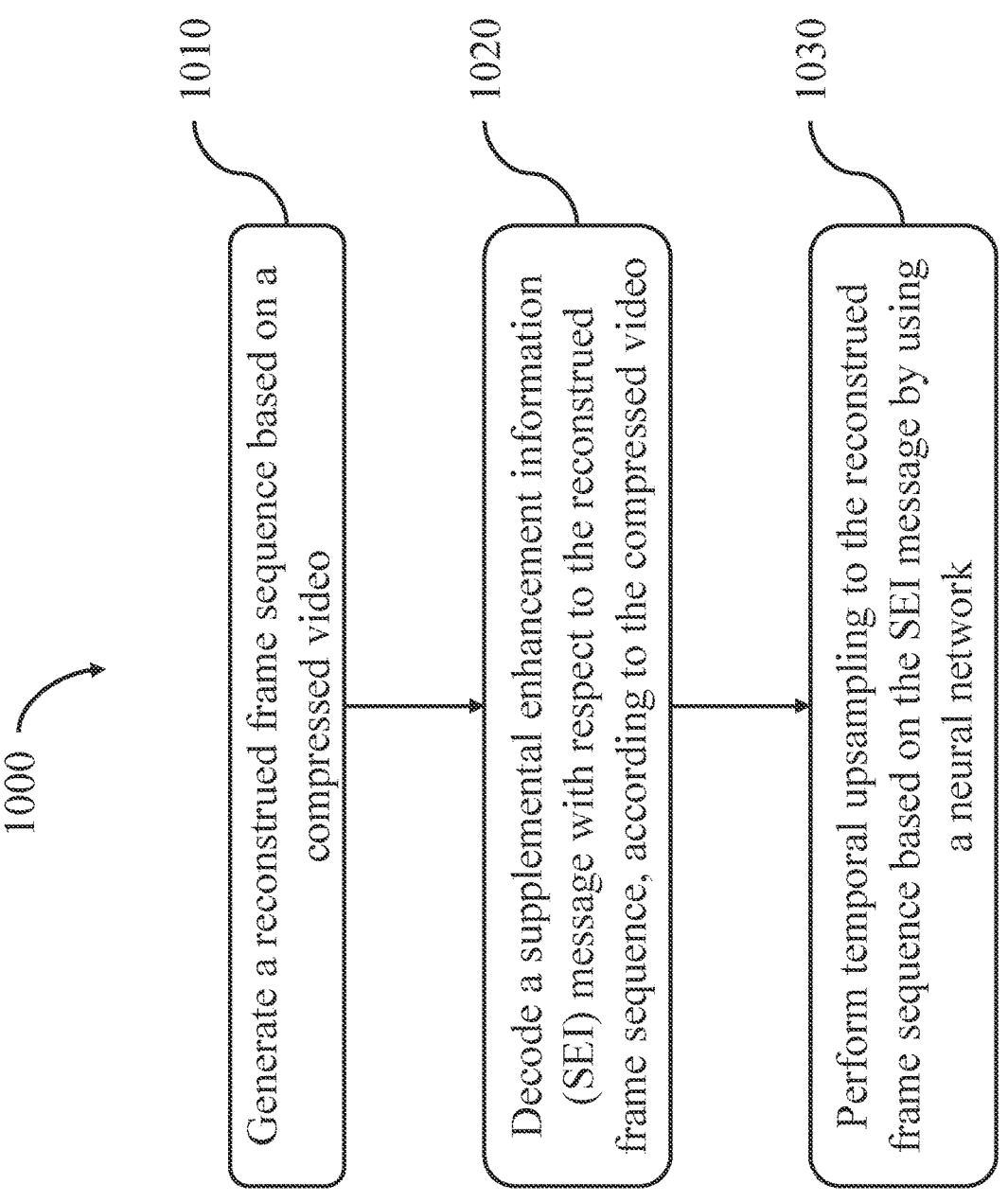
FIG. 10 illustrates a flowchart of an exemplary method for decoding video data, according to some embodiments of the present disclosure.

FIG. 10 illustrates a flowchart of an exemplary method 1000 for decoding video data, according to some embodiments of the present disclosure. For example, method 1000 may be performed by one or more processors, such as image/video decoder 144 (FIG. 1). In some embodiments, image/video decoder 144 may be integrated into apparatus 400 shown in FIG. 4, such that method 1000 can be performed by apparatus 400. In some other examples, method 1000 may be performed by a decoder that is simulated by a general purpose processing unit and necessarily auxiliary components. In this situation, the decoder is implemented as an application or program for the users. As shown in FIG. 10, method 1000 includes the following steps 1010 to 1030.

At step 1010, the decoder generates a reconstructed frame sequence based on a compressed video. The decoder may decode the compressed frame sequence transmitted from the encoder side which follows a common specification used to encode the compressed frame sequence. For example, the decode can obtain a reconstructed frame sequence by following the specifications according to Advanced Video Coding (AVC), High Efficiency Video Coding (HEVC), Versatile Video Coding (VVC) or other video standards.

At step 1020, the decoder decodes a supplemental enhancement information (SEI) message with respect to the reconstructed frame sequence, according to the compressed video. As described above, the SEI message can be included in the compressed video, and can be used to instruct whether and how to perform temporal upsampling to the compressed video received.

At step 1030, the decoder performs temporal upsampling to the reconstructed frame sequence based on the SEI message by using a neural network. As such, the decoder can obtain a video segment with higher frame rate. The communication expense between the encoder and the decoder can be reduced somehow. FIG. 11 illustrates a flowchart of sub-steps of exemplary method 1000 for decoding video data shown in FIG. 10, according to some embodiments of the present disclosure. As shown in FIG. 11, step 1030 includes the following sub-steps 1110 and 1120.

Figure 12:
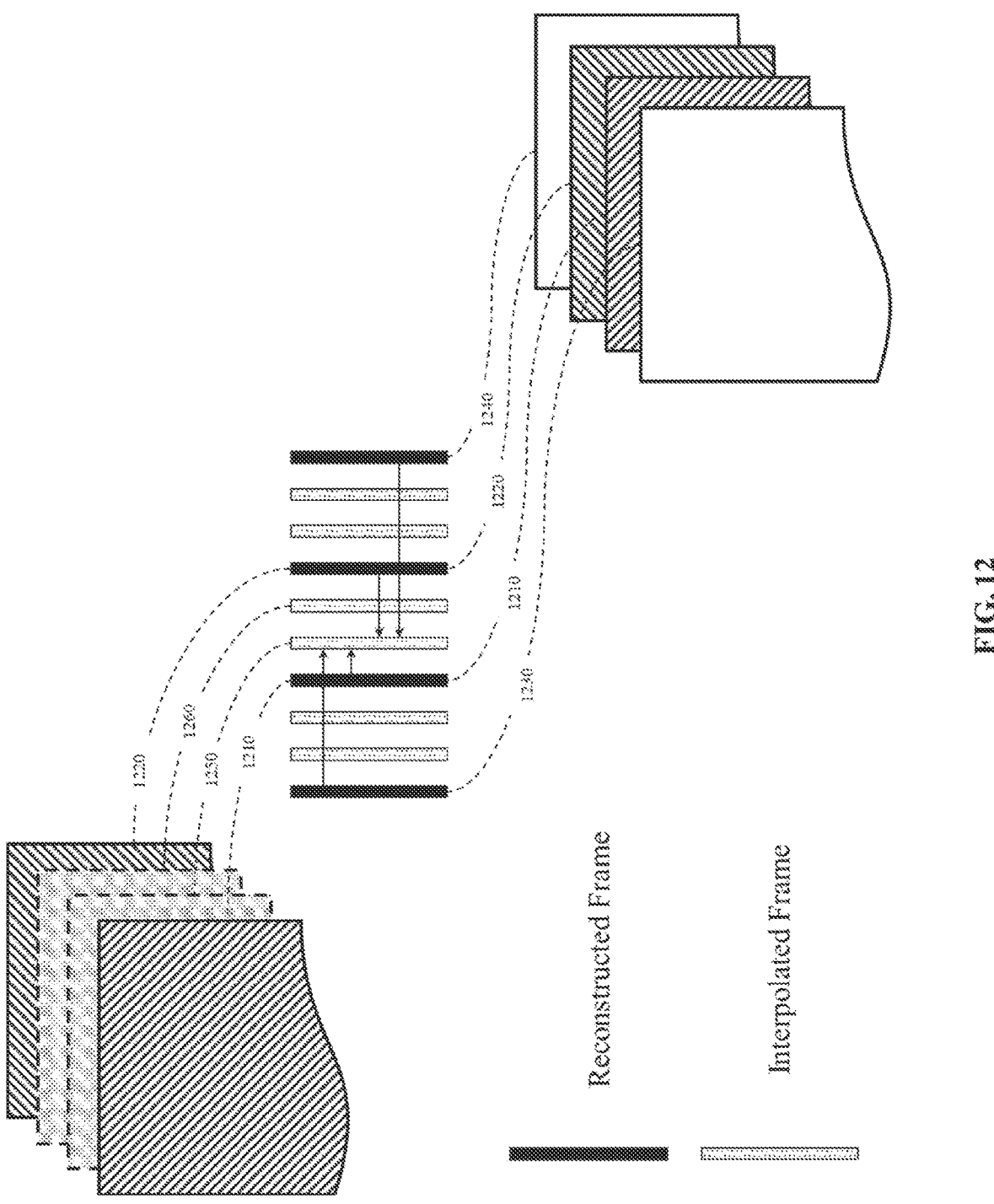
FIG. 12 is a schematic diagram illustrating an exemplary process for interpolating frames, consistent with embodiments of the disclosure.

At sub-step 1110, the decoder determines, based on the SEI message, an upsampling number and a referencing range relative to a first frame and a second frame within the reconstructed frame sequence, the second frame being adjacent to the first frame. FIG. 12 is a schematic diagram illustrating an exemplary process for interpolating frames, consistent with embodiments of the disclosure. As shown in FIG. 12, four reconstructed frames 1230, 1210, 1220, and 1240 are sorted in order. If the determined number of frames based on the SEI message is two, then two interpolated frames 1250 and 1260 can be interpolated between frames 1210 and 1220. In addition, if the determined referencing range is two reconstructed frames to the front and rear of the interpolating place, respectively, then frames 1250 and 1260 are interpolated by referencing frames 1210, 1220, 1230, and 1240. Likewise, frames can be interpolated between frames 1230 and 1210, between frames 1220 and 1240.

At sub-step 1120, the decoder interpolates, via the neural network, the upsampling number of frames between the first frame and the second frame by referencing within the referencing range. The interpolation process can be realized by a conventional neural network. The decoder can input the requirements (e.g., the upsampling number and the referencing range) to the neural network to get the interpolated frames between the first frame and the second frame.

Figures 13, 14, 15:
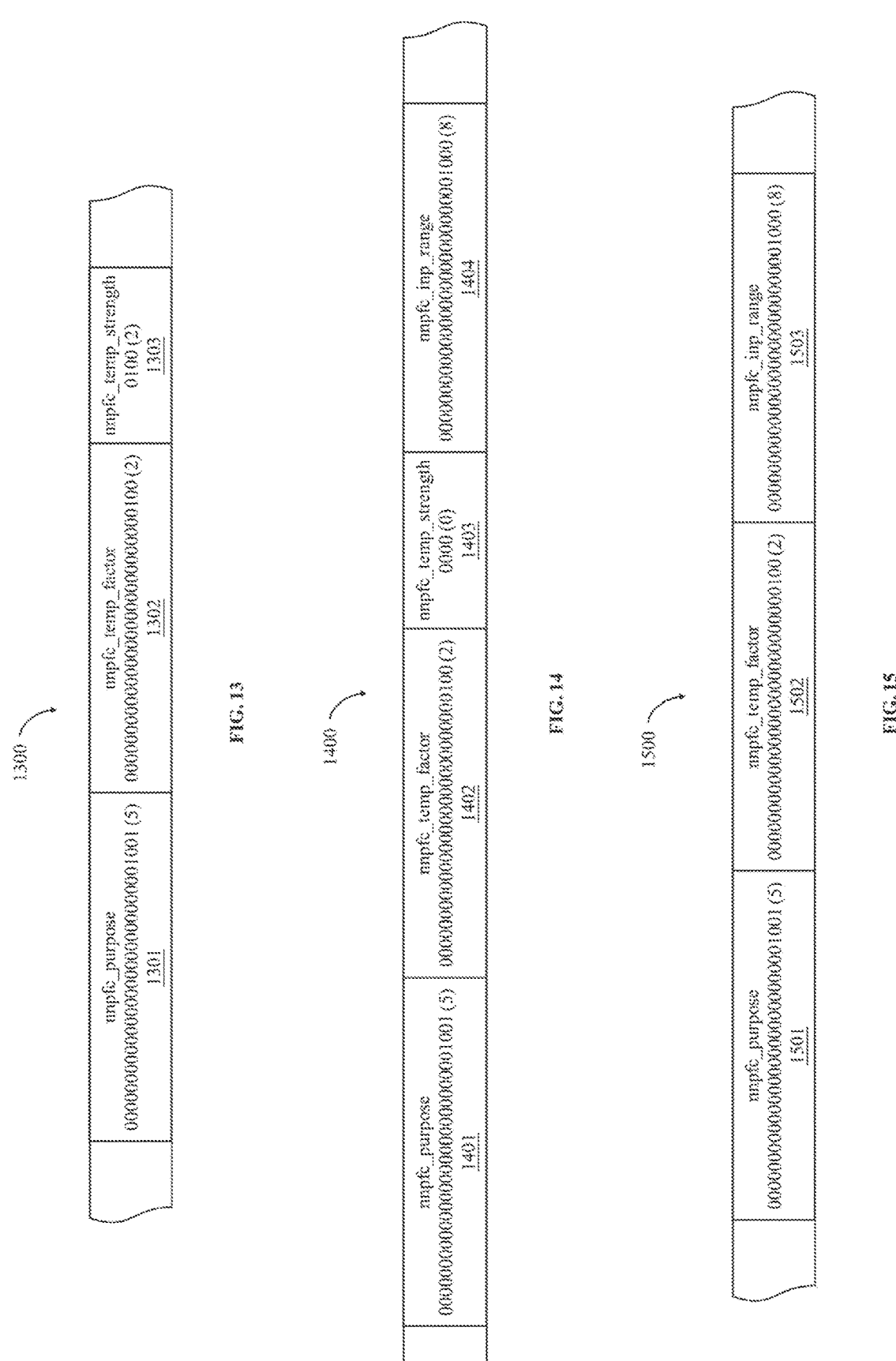
FIG. 13 is a schematic diagram illustrating an exemplary segment of decoded SEI message, according to some embodiments of the present disclosure.
FIG. 14 is a schematic diagram illustrating another exemplary segment of decoded SEI message, according to some embodiments of the present disclosure.
FIG. 15 is a schematic diagram illustrating another exemplary segment of decoded SEI message, according to some embodiments of the present disclosure.

FIG. 13 is a schematic diagram illustrating an exemplary segment of decoded SEI message 1300, according to some embodiments of the present disclosure. Decoded SEI message 1300, which corresponds to SEI message 700 shown in FIG. 7, includes three indicators: (1) nnpfc_purpose 1301 for indicating whether to perform temporal upsampling to the frame sequence by using a neural network; (2) nnpfc_temp_factor 1302 for indicating the upsampling number; and (3) nnpfc_temp_strength 1303 for indicating an upsampling strength describing a relationship between the upsampling number and the referencing range. The decoder can determine the referencing range based on nnpfc_temp_factor 1302 and nnpfc_temp_strength 1303.

With further reference to Table 11, nnpfc_purpose (e.g., nnpfc_purpose 1301 shown in FIG. 13) within the decoded SEI message can be used to indicate whether to perform temporal upsampling to the frame sequence by using the neural network. Specifically, a value of the indicator nnpfc_purpose can be set to 5 if temporal upsampling is expected in the decoder. When the value of the indicator nnpfc_purpose is otherwise set (e.g., 1, 2, 3, or 4), the decoder does not conduct a temporal upsampling towards the reconstructed frame sequence. In some embodiments, the value of the indicator nnpfc_purpose can be greater than 5, which is used for indicating other purposes and not described here. In some embodiments, as shown in FIG. 13, nnpfc_purpose 1301 can be decoded as 32 bits.

As also shown in Table 11, the decoded SEI message may also indicate an upsampling number and a referencing range showing how to perform temporal upsampling to the frame sequence by using the neural network. The neural network of the decoder can interpolate the upsampling number of frames between two adjacent frames of the frame sequence by referencing frames within the referencing range.

nnpfc_temp_factor (e.g., nnpfc_temp_factor 1302 shown in FIG. 13) indicates the temporal upsampling factor in a range from 1 to 232-1 (inclusive), which means the upsampled frame number between a previous frame and a current decoded (reconstructed) frame. In some embodiments, as shown in FIG. 13, nnpfc_temp_factor 1302 can be decoded as 32 bits.

For example, with further reference to FIG. 12, if nnpfc_temp_factor 1302 is decoded as 2 and the current decoded (reconstructed) frame index is 1220, the decoder can interpolate 2 frames between the decoded frames 1210 and 1220 by means of the temporal upsampling model, when receiving SEI message 1300.

As also shown in Table 11, nnpfc_temp_strength (e.g., nnpfc_temp_strength 1303 shown in FIG. 13) indicates the temporal resampling strength in a range from 0 to 15. The temporal resampling strength defines the relationship between the temporal upsampling factor (e.g., nnpfc_temp_factor 1302 shown in FIG. 13) and the input frame range of the temporal upsampling network, which is denoted as NumInputTem. As such, the decoder can determine the referencing range based on nnpfc_temp_factor 1302 and nnpfc_temp_strength 1303. Specifically, NumInputTem=nnpfc_temp_strength*nnpfc_temp_factor, if nnpfc_temp_strength is not equal to 0. Alternatively, NumInputTem=(nnpfc_temp_strength+1)*nnpfc_temp_factor, by which nnpfc_temp_strength can be equal to 0. In some embodiments, as shown in FIG. 13, nnpfc_temp_strength 1303 can be decoded as 4 bits.

For example, with further reference to FIG. 12, if nnpfc_temp_factor 1302 is decoded as 2 and nnpfc_temp_strength 1303 is decoded as 1, then NumInputTem can be derived as 2. For the current frame index 1220, the input frame indexes indicating a reference rage to the temporal upsampling network can be 1230, 1210, 1220 and 1240.

FIG. 14 is a schematic diagram illustrating another exemplary segment of decoded SEI message 1400, according to some embodiments of the present disclosure. Decoded SEI message 1400, which corresponds to SEI message 800 shown in FIG. 8, includes four indicators: (1) nnpfc_purpose 1401 for indicating whether to perform temporal upsampling to the frame sequence by using a neural network; (2) nnpfc_temp_factor 1402 for indicating the upsampling number; (3) nnpfc_temp_strength 1403 for indicating an upsampling strength describing a relationship between the upsampling number and the referencing range; and (4) nnpfc_inp_range 1404 for indicating the referencing range. The decoder side can determine the referencing range based on (A) nnpfc_temp_factor 1302 and nnpfc_temp_strength 1303, or (B) nnpfc_inp_range 1304 directly.

As also shown in Table 11, nnpfc_inp_range (e.g., nnpfc_inp_range 1404 shown in FIG. 14) indicates the bidirectional input range of the reconstructed frames for the temporal upsampling network in a range from 1 to 232−1 (inclusive). In some embodiments, the referencing range can be determined based on nnpfc_temp_factor 1402 and nnpfc_temp_strength 1403 by the decoder. Specifically, NumInputTem=nnpfc_temp_strength*nnpfc_temp_factor, if nnpfc_temp_strength is not equal to 0. In some embodiments, nnpfc_inp_range can be utilized as NumInputTem if and only if nnpfc_temp_strength is equal to 0. In some embodiments, as shown in FIG. 14, nnpfc_temp_strength 1404 can be encoded with 32 bits.

Compared with decoded SEI message 1300 in FIG. 13, decoded SEI message 1400 can carry more range information while the communication overhead may be higher. FIG. 15 is a schematic diagram illustrating another exemplary segment of decoded SEI message 1500, according to some embodiments of the present disclosure. Decoded SEI message 1500, which corresponds to SEI message 900 shown in FIG. 9, includes three indicators: (1) nnpfc_purpose 1501 for indicating whether to perform temporal upsampling to the frame sequence by using a neural network; (2) nnpfc_temp_factor 1502 for indicating the upsampling number; and (3) nnpfc_inp_range 1503 for indicating the referencing range. The decoder can determine the referencing range based on nnpfc_inp_range 1503 directly.

Figure 16:
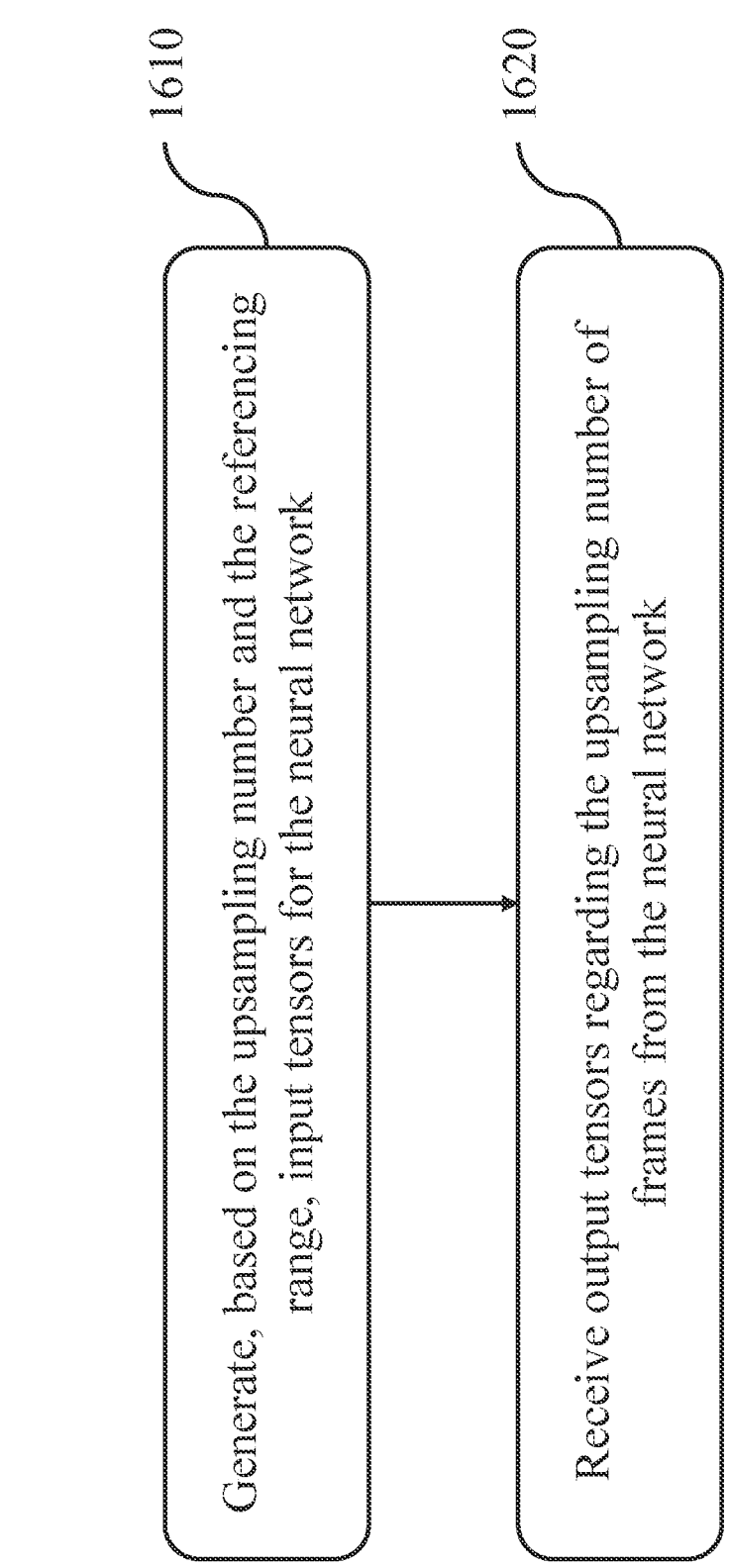
FIG. 16 illustrates a flowchart of sub-steps of the exemplary method for decoding video data shown in FIG. 10, according to some embodiments of the present disclosure.

FIG. 16 illustrates a flowchart of sub-steps of the exemplary method for decoding video data shown in FIG. 10, according to some embodiments of the present disclosure. As shown in FIG. 16, step 1120 includes following sub-steps S1610 and S1620.

At sub-step 1610, the decoder generates input tensors for the neural network based on the upsampling number and the referencing range. The input tensors can be generated based on the following process:

A function InpSampleValTem(y, x, picHeight, picWidth, croppedSeq, picIdx) with inputs being a vertical sample location y, a horizontal sample location x, a picture height picHeight, a picture width picWidth, and sample array croppedSeq returns the value of sampleVal derived as follows (wherein, croppedSeq is the sample array of the decoded video file with spatial-wise crop only before temporal upsampling, and the decoded frame indexes, denoted as picIdx, are in the highest dimension, which means the shape of croppedSeq is [picWidth, picHeight, frame_num] and frame_num is the frame number of the decoded sequence):

```
croppedPic= croppedSeq[:, :, picIdx]
if( nnpfc__padding__type = = 0 )
    if( y < 0 | | x < 0 | | y >= picHeight | | x >= picWidth )
        sampleVal = 0
    else
        sampleVal = croppedPic[ x ][ y ]
else if( nnpfc__padding__type = = 1 )
    sampleVal = croppedPic[ Clip3( 0, picWidth − 1, x ) ][ Clip3( 0,
    picHeight − 1,
y ) ]
else if( nnpfc__padding__type = = 2 )
    sampleVal = croppedPic[ Reflect( picWidth − 1,
    x ) ][ Reflect( picHeight − 1,
y ) ]
else if( nnpfc__padding__type = = 3 )
    if( y >= 0 && y < picHeight )
        sampleVal = croppedPic[ Wrap( picWidth − 1, x ) ][ y ]
else if( nnpfc__padding__type = = 4 )
    if( y < 0 | | x < 0 | | y >= picHeight | | x >= picWidth )
        sampleVal[ 0 ] = nnpfc__luma__padding__val
            sampleVal[ 1 ] = nnpfc__cb__padding__val
        sampleVal[ 2 ] = nnpfc__cr__padding__val
    else
        sampleVal = croppedPic[ x ][ y ]            (Definition
15)
```

The input of the temporal upsampling network should also be specified as follows, by a process called DeriveInputTensorsTem( ), showing in Table 14. CurPicIdx indicates the frame index of the current decoded (reconstructed) frame in the decoded video. Specifically, if nnpfc_purpose is equal to 5, the DeriveInputTensors( ) process can be replaced with DeriveInputTensorsTem( ).

TABLE 14

| nnpfc_inp_order_idc | Process DeriveInputTensorsTem( ) for deriving input tensors |
|---|---|

DeriveInputTensorsTem( ) syntax

0

```
for(idx_picture_input=CurPicIdx– NumInputTem; idx_picture_input <
CurPicIdx + NumInputTem; idx_picture_input++){
    for( yP = –overlapSize; yP < inpPatchHeight + overlapSize; yP++)
    for( xP = –overlapSize; xP < inpPatchWidth + overlapSize; xP++ ) {
        inpVal = InpY( InpSampleValTem( cTop + yP, cLeft + xP, CroppedHeight,
            CroppedWidth, croppedSeq, idx_picture_input) )
        if( nnpfc_component_last_flag = = 0 )
            inputTensor[ 0 ][ idx_picture_input– CurPicIdx+ NumInputTem][ yP +
        overlapSize ][ xP + overlapSize ] = inpVal
          else
            inputTensor[ 0 ][ yP + overlapSize ][ xP +
        overlapSize ][ idx_picture_input– CurPicIdx+ NumInputTem ] = inpVal
        if( nnpfc_auxiliary_inp_idc = = 1 )
            if( nnpfc_component_last_flag = = 0 )
                inputTensor[ 0 ][ 2* NumInputTem][ yP + overlapSize ][ xP +
        overlapSize ] = 2$^{( StrengthControlVal – 42 ) / 6}$
              else
                inputTensor[ 0 ][ yP + overlapSize ][ xP + overlapSize ][ 2*
        NumInputTem] = 2$^{( StrengthControlVal – 42 ) / 6}$
    }
}
```

1

```
for(idx_picture_input=CurPicIdx– NumInputTem; idx_picture_input <
CurPicIdx + NumInputTem; idx_picture_input++){
    for( yP = –overlapSize; yP < inpPatchHeight + overlapSize; yP++)
    for( xP = –overlapSize; xP < inpPatchWidth + overlapSize; xP++ ) {
        inpCbVal = InpC( InpSampleValTem( cTop + yP, cLeft + xP,
    CroppedHeight / SubHeightC,
            CroppedWidth / SubWidthC, croppedSeq, idx_picture_input) )
        inpCrVal = InpC( InpSampleValTem( cTop + yP, cLeft + xP,
    CroppedHeight / SubHeightC,
            CroppedWidth / SubWidthC, croppedSeq, idx_picture_input) )
        if( nnpfc_component_last_flag = = 0 ) {
            inputTensor[ 0 ][ idx_picture_input– CurPicIdx+ NumInputTem ][ yP +
        overlapSize ][ xP + overlapSize ] = inpCbVal
            inputTensor[ 0 ][ idx_picture_input– CurPicIdx+ (2+1)*
        NumInputTem][ yP + overlapSize ][ xP + overlapSize ] = inpCrVal
        } else {
            inputTensor[ 0 ][ yP + overlapSize ][ xP +
        overlapSize ][ idx_picture_input– CurPicIdx+ NumInputTem ] = inpCbVal
            inputTensor[ 0 ][ yP + overlapSize ][ xP +
        overlapSize ][ idx picture_input– CurPicIdx+ (2+1)* NumInputTem ] =
        inpCrVal
        }
        if(nnpfc_auxiliary_inp_idc = = 1)
            if( nnpfc_component_last_flag = = 0 )
                inputTensor[ 0 ][ 4* NumInputTem ][ yP + overlapSize ][ xP +
        overlapSize ] = 2$^{( StrengthControlVal – 42 ) / 6}$
              else
                inputTensor[ 0 ][ yP + overlapSize ][ xP + overlapSize ][ 4*
        NumInputTem ] = 2$^{( StrengthControlVal – 42) / 6}$
    }
```

2

```
for(idx_picture_input=CurPicIdx– NumInputTem; idx_picture_input <
CurPicIdx + NumInputTem; idx_picture_input++){
    for( yP = –overlapSize; yP < inpPatchHeight + overlapSize; yP++)
    for( xP = –overlapSize; xP < inpPatchWidth + overlapSize; xP++ ) {
        yY = cTop + yP
        xY = cLeft + xP
        yC = yY / SubHeightC
        xC = xY / SubWidthC
        inpYVal = InpY( InpSampleValTem( yY, xY, CroppedHeight,
            CroppedWidth, croppedSeq, idx_picture_input) )
        inpCbVal = InpC( InpSampleValTem( yC, xC, CroppedHeight /
    SubHeightC,
            CroppedWidth / SubWidthC, croppedSeq, idx_picture_input ) )
        inpCrVal = InpC( InpSampleValTem( yC, xC, CroppedHeight /
    SubHeightC,
            CroppedWidth / SubWidthC, croppedSeq, idx_picture_input ) )
        if( nnpfc_component_last_flag = = 0 ) {
            inputTensor[ 0 ][ idx_picture_input– CurPicIdx+ NumInputTem ][ yP +
        overlapSize ][ xP + overlapSize ] = inpYVal
            inputTensor[ 0 ][ idx_picture_input– CurPicIdx+(2+1)*
        NumInputTem ][ yP + overlapSize ][ xP + overlapSize ] = inpCbVal
            inputTensor[ 0 ][ idx_picture_input– CurPicIdx+ (4+1)*
        NumInputTem ][ yP + overlapSize ][ xP + overlapSize ] = inpCrVal
        } else {
            inputTensor[ 0 ][ yP + overlapSize ][ xP +
```

TABLE 14-continued

DeriveInputTensorsTem( ) syntax nnpfc_inp_order_idc   Process DeriveInputTensorsTem( ) for deriving input tensors

```
                    overlapSize ][ idx_picture_input– CurPicIdx+ NumInputTem ] = inpYVal
                       inputTensor[ 0 ][ yP + overlapSize ][ xP +
                    overlapSize ][ idx_picture_input– CurPicIdx+(2+1)* NumInputTem ] =
                    inpCbVal
                       inputTensor[ 0 ][ yP + overlapSize ][ xP +
                    overlapSize ][ idx_picture_input– CurPicIdx+(4+1)* NumInputTem ] =
                    inpCrVal
                       }
                    if(nnpfc_auxiliary_inp_idc = = 1)
                       if( nnpfc_component_last_flag = = 0 )
                          inputTensor[ 0 ][ 6* NumInputTem ][ yP + overlapSize ][ xP +
                    overlapSize ] = 2^{( StrengthControlVal − 42) / 6}
                       else
                          inputTensor[ 0 ][ yP + overlapSize ][ xP + overlapSize ][ 6*
                    NumInputTem ] = 2^{( StrengthControlVal − 42) / 6}
                    }
                    }
3                   for(idx_picture_input=CurPicIdx– NumInputTem; idx_picture_input <
                    CurPicIdx + NumInputTem; idx_picture_input++){
                       for( yP = –overlapSize; yP < inpPatchHeight + overlapSize; yP++)
                       for( xP = –overlapSize; xP < inpPatchWidth + overlapSize; xP++ ) {
                          yTL = cTop + yP * 2
                          xTL = cLeft + xP * 2
                          yBR = yTL + 1
                          xBR = xTL + 1
                          yC = cTop / 2 + yP
                          xC = cLeft / 2 + xP
                          inpTLVal = InpY( InpSampleValTem( yTL, xTL, CroppedHeight,
                             CroppedWidth, croppedSeq, idx_picture_input ) )
                          inpTRVal = InpY( InpSampleValTem( yTL, xBR, CroppedHeight,
                             CroppedWidth, croppedSeq, idx_picture_input) )
                          inpBLVal = InpY( InpSampleValTem( yBR, xTL, CroppedHeight,
                             CroppedWidth, croppedSeq, idx_picture_input ) )
                          inpBRVal = InpY( InpSampleValTem( yBR, xBR, CroppedHeight,
                             CroppedWidth, croppedSeq, idx_picture_input ) )
                          inpCbVal = InpC( InpSampleValTem( yC, xC, CroppedHeight / 2,
                             CroppedWidth / 2, croppedSeq, idx_picture_input ) )
                          inpCrVal = InpC( InpSampleValTem( yC, xC, CroppedHeight / 2,
                             CroppedWidth / 2, croppedSeq, idx_picture_input ) )
                          if( nnpfc_component_last_flag = = 0 ) {
                             inputTensor[ 0 ][ idx_picture_input– CurPicIdx+ NumInputTem ][ yP +
                    overlapSize ][ xP + overlapSize ] = inpTLVal
                             inputTensor[ 0 ][ idx_picture_input– CurPicIdx+(1+2)*
                    NumInputTem ][ yP + overlapSize ][ xP + overlapSize ] = inpTRVal
                             inputTensor[ 0 ][ idx_picture_input– CurPicIdx+(1+4)*
                    NumInputTem ][ yP + overlapSize ][ xP + overlapSize ] = inpBLVal
                             inputTensor[ 0 ][ idx_picture_input– CurPicIdx+(1+6)*
                    NumInputTem ][ yP + overlapSize ][ xP + overlapSize ] = inpBRVal
                             inputTensor[ 0 ][ idx_picture_input– CurPicIdx+(1+8)*
                    NumInputTem ][ yP + overlapSize ][ xP + overlapSize ] = inpCbVal
                             inputTensor[ 0 ][ idx_picture_input– CurPicIdx+(1+10)*
                    NumInputTem ][ yP + overlapSize ][ xP + overlapSize ] = inpCrVal
                          } else {
                             inputTensor[ 0 ][ yP + overlapSize ][ xP +
                    overlapSize ][ idx_picture_input– CurPicIdx+ NumInputTem ] = inpTLVal
                             inputTensor[ 0 ][ yP + overlapSize ][ xP +
                    overlapSize ][ idx_picture_input– CurPicIdx+ (1+2)* NumInputTem ] =
                    inpTRVal
                             inputTensor[ 0 ][ yP + overlapSize ][ xP +
                    overlapSize ][ idx_picture_input– CurPicIdx+ (1+4)* NumInputTem ] =
                    inpBLVal
                             inputTensor[ 0 ][ yP + overlapSize ][ xP +
                    overlapSize ][ idx_picture_input– CurPicIdx+(1+6)* Num InputTem ] =
                    inpBRVal
                             inputTensor[ 0 ][ yP + overlapSize ][ xP +
                    overlapSize ][ idx_picture_input– CurPicIdx+ (1+8)* NumInputTem ] =
                    inpCbVal
                             inputTensor[ 0 ][ yP + overlapSize ][ xP +
                    overlapSize ][ idx_picture_input– CurPicIdx+ (1+10)* NumInputTem ] =
                    inpCrVal
                          if(nnpfc_auxiliary_inp_idc = = 1)
                             if( nnpfc_component_last_flag = = 0 )
                                inputTensor[ 0 ][ 10* NumInputTem ][ yP + overlapSize ][ xP +
                    overlapSize ] = 2^{( StrengthControlVal − 42 ) / 6}
                             else
                                inputTensor[ 0 ][ yP + overlapSize ][ xP + overlapSize ][ 10*
```

TABLE 14-continued

| DeriveInputTensorsTem( ) syntax | |
| --- | --- |
| nnpfc_inp_order_idc | Process DeriveInputTensorsTem( ) for deriving input tensors |

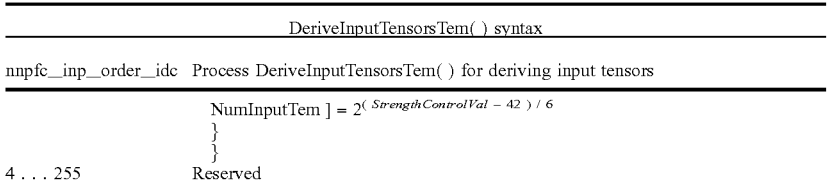

| | NumInputTem ] = $2^{(\ StrengthControlVal\ -\ 42\ )\ /\ 6}$ $\}$ $\}$ $\}$ |
| 4 . . . 255 | Reserved |

Moreover, the process for deriving sample values in the filtered output sample arrays is also specified in Table 15. Turning back to FIG. 16, at sub-step 1620, the decoder receives output tensors regarding the upsampling number of frames from the neural network. The output tensors can be generated according to the syntax shown in Table 15.

Specifically, StoreOutputTensorsTem( ) defines the output tensor store format of the temporal upsampled pictures between the current decoded picture and the previous picture. Similarly, if nnpfc_purpose is equal to 5, the StoreOutputTensors( ) process can be replaced with StoreOutputTensorsTem( ).

TABLE 15

| | StoreOutputTensorsTem( ) syntax |
| --- | --- |
| nnpfc_out_order_idc | Process StoreOutputTensorsTem( ) for deriving sample values in the filtered picture from the output tensors |
| 0 | for(cur_out_idx=0; cur_out_idx< nnpfc_temp_factor; cur_out_idx++){<br>  for( yP = 0; yP < outPatchHeight; yP++)<br>  for( xP = 0; xP < outPatchWidth; xP++ ) {<br>    yY = cTop * outPatchHeight / inpPatchHeight + yP<br>    xY = cLeft * outPatchWidth / inpPatchWidth + xP<br>    if ( yY < nnpfc_pic_height_in_luma_samples && xY <<br>  nnpfc_pic_width_in_luma_samples )<br>      if( nnpfc_component_last_flag = = 0 )<br>        FilteredYPic[ xY ][yY ][ cur_out_idx] =<br>  OutY( outputTensor[ 0 ][ cur_out_idx ][ yP ][ xP ] )<br>      else<br>        FilteredYPic[ xY ][ yY ][ cur_out_idx] =<br>  OutY( outputTensor[ 0 ][ yP ][ xP ][ cur_out_idx ] )<br>  }<br>  }<br>} |
| 1 | for(cur_out_idx=0; cur_out_idx< nnpfc_temp_factor; cur_out_idx++){<br>  for( yP = 0; yP < outPatchCHeight; yP++)<br>  for( xP = 0; xP < outPatchCWidth; xP++ ) {<br>    xSrc = cLeft * horCScaling + xP<br>    ySrc = cTop * verCScaling + yP<br>    if ( ySrc < nnpfc_pic_height_in_luma_samples / outSubHeightC &&<br>        xSrc < nnpfc_pic_width_in_luma_samples / outSubWidthC )<br>      if( nnpfc_component_last_flag = = 0 ) {<br>        FilteredCbPic[ xSrc ][ ySrc ][ cur_out_idx] =<br>  OutC( outputTensor[ 0 ][ cur_out_idx ][ yP ][ xP ] )<br>        FilteredCrPic[ xSrc ][ ySrc ][ cur_out_idx] =<br>  OutC( outputTensor[ 0 ][ nnpfc_temp_factor +cur_out_idx ][ yP ][ xP ] )<br>      } else {<br>        FilteredCbPic[ xSrc ][ ySrc ] =<br>  OutC( outputTensor[ 0 ][ yP ][ xP ][ cur_out_idx ] )<br>        FilteredCrPic[ xSrc ][ ySrc ] =<br>  OutC( outputTensor[ 0 ][ yP ][ xP ][ nnpfc_temp_factor +cur_out_idx ] )<br>      }<br>  }<br>} |
| 2 | for(cur_out_idx=0; cur_out_idx< nnpfc_temp_factor; cur_out_idx++){<br>  for( yP = 0; yP < outPatchHeight; yP++)<br>  for( xP = 0; xP < outPatchWidth; xP++ ) {<br>    yY = cTop * outPatchHeight / inpPatchHeight + yP<br>    xY = cLeft * outPatchWidth / inpPatchWidth + xP<br>    yC = yY / outSubHeightC<br>    xC = xY / outSubWidthC<br>    yPc = ( yP / outSubHeightC ) * outSubHeightC<br>    xPc = ( xP / outSubWidthC ) * outSubWidthC<br>    if ( yY < nnpfc_pic_height_in_luma_samples && xY <<br>  nnpfc_pic_width_in_luma_samples)<br>      if( nnpfc_component_last_flag = = 0 ) {<br>        FilteredYPic[ xY ][ yY ] =<br>  OutY( outputTensor[ 0 ][ cur_out_idx ][ yP ][ xP ] )<br>        FilteredCbPic[ xC ][ yC ] = OutC( outputTensor[ 0 ][ cur_out_idx+<br>  nnpfc_temp_factor ][ yPc ][ xPc ] )<br>        FilteredCrPic[ xC ][ yC ] = OutC( outputTensor[ 0 ][ cur_out_idx+2*<br>  nnpfc_temp_factor ][ yPc ][ xPc ] ) |

TABLE 15-continued

| StoreOutputTensorsTem( ) syntax | |
|---|---|
| nnpfc_out_order_idc | Process StoreOutputTensorsTem( ) for deriving sample values in the filtered picture from the output tensors |

```
            } else {
                FilteredYPic[ xY ][ yY ] =
        OutY( outputTensor[ 0 ][ yP ][ xP ][ cur_out_idx ] )
                FilteredCbPic[ xC ][ yC ] =
        OutC( outputTensor[ 0 ][ yPc ][ xPc ][ cur_out_idx+ nnpfc_temp_factor ] )
                FilteredCrPic[ xC ][ yC ] =
        OutC( outputTensor[ 0 ][ yPc ][ xPc ][ cur_out_idx+2* nnpfc_temp_factor ] )
                }
            }
        }
```

3
```
        for(cur_out_idx=0; cur_out_idx< nnpfc_temp_factor; cur_out_idx++){
            for( yP = 0; yP < outPatchHeight; yP++ )
            for( xP = 0; xP < outPatchWidth; xP++ ) {
                ySrc = cTop / 2 * outPatchHeight / inpPatchHeight + yP
                xSrc = cLeft / 2 * outPatch Width / inpPatch Width + xP
                if ( ySrc < nnpfc_pic_height_in_luma_samples / 2 &&
                    xSrc < nnpfc_pic_width_in_luma_samples / 2 )
                    if( nnpfc_component_last_flag = = 0 ) {
                        FilteredYPic[ xSrc * 2 ][ ySrc * 2 ] =
        OutY( outputTensor[ 0 ][ cur_out_idx ][ yP ][ xP ] )
                        FilteredYPic[ xSrc * 2 + 1 ][ ySrc * 2 ] =
        OutY( outputTensor[ 0 ][ cur_out_idx+ nnpfc_temp_factor ][ yP ][ xP ] )
                        FilteredYPic[ xSrc * 2 ][ ySrc * 2 + 1 ] =
        OutY( outputTensor[ 0 ][ cur_out_idx+ 2*nnpfc_temp_factor ][ yP ][ xP ] )
                        FilteredYPic[ xSrc * 2 + 1][ ySrc * 2 + 1 ] =
        OutY( outputTensor[ 0 ][ cur_out_idx+ 3*nnpfc_temp_factor ][ yP ][ xP ] )
                        FilteredCbPic[ xSrc ][ ySrc ] = OutC( outputTensor[ 0 ][ cur_out_idx+
        4*nnpfc_temp_factor ][ yP ][ xP ] )
                        FilteredCrPic[ xSrc ][ ySrc ] = OutC( outputTensor[ 0 ][ cur_out_idx+
        5*nnpfc_temp_factor ][ yP ][ xP ] )
                    } else {
                        FilteredYPic[ xSrc * 2 ][ ySrc * 2 ] =
        OutY( outputTensor[ 0 ][ yP ][ xP ][ cur_out_idx ] )
                        FilteredYPic[ xSrc * 2 + 1 ][ ySrc * 2 ] =
        OutY( outputTensor[ 0 ][ yP ][ xP ][ cur_out_idx+ nnpfc_temp_factor ] )
                        FilteredYPic[ xSrc * 2 ][ ySrc * 2 + 1 ] =
        OutY( outputTensor[ 0 ][ yP ][ xP ][ cur_out_idx+ 2*nnpfc_temp_factor ] )
                        FilteredYPic[ xSrc * 2 + 1][ ySrc * 2 + 1 ] =
        OutY( outputTensor[ 0 ][ yP ][ xP ][ cur_out_idx+ 3*nnpfc_temp_factor ] )
                        FilteredCbPic[ xSrc ][ ySrc ] =
        OutC( outputTensor[ 0 ][ yP ][ xP ][ cur_out_idx+ 4*nnpfc_temp_factor ] )
                        FilteredCrPic[ xSrc ][ ySrc ] =
        OutC( outputTensor[ 0 ][ yP ][ xP ][ cur_out_idx+ 5*nnpfc_temp_factor ] )
                    }
                }
            }
```
4 . . . 255      Reserved In some embodiments, the solutions shown in Table 11 and Table 12 can be alternatively implemented as the following Table 16. Table 16 shows a segment of the syntax, while other parts of the syntax can be inherited from Table 11 and Table 12.

TABLE 16

| Syntax of NNPFC SEI message for machine vision | |
|---|---|
| if(nnpfc_purpose = = 5){ | |
| nnpfc_temp_factor | ue(v) |
| nnpfc_temp_strength | ue(v) |
| } | |

As described above, decoded SEI message 1300 in FIG. 13 includes three indicators: nnpfc_purpose 1301, nnpfc_temp_factor 1302, and nnpfc_temp_strength 1303. Decoded SEI message 1300 may also follow the syntax shown in Table 16.

As shown in Table 16, nnpfc_temp_factor (e.g., nnpfc_temp_factor 1302 shown in FIG. 13) indicates the temporal upsampling factor in a range from 1 to $2^{32}-1$ (inclusive), which means the upsampled frame number between the previous frame and current decoded (reconstructed) frame.

For example, if nnpfc_temp_factor 1302 is decoded as 2 and the current decoded (reconstructed) frame index is i, there should be 2 frames generated between decoded frame i−1 and decoded frame i by means of the temporal upsampling model.

As also shown in Table 16, nnpfc_temp_strength (e.g., nnpfc_temp_strength 1303 shown in FIG. 13) indicates the temporal resampling strength in a range from 0 to 15. The temporal resampling strength defines the relationship between the temporal upsampling factor (e.g., nnpfc_temp_factor 1302 shown in FIG. 13) and the input frame range of the temporal upsampling network, which is denoted as NumInputTem. Specifically, NumInputTem=(nnpfc_temp_strength+1)*nnpfc_temp_factor, by which nnpfc_temp_strength can be equal to 0.

In some embodiments, the solutions shown in Table 11 and Table 12 can be alternatively implemented as the following Table 17. Table 17 shows a segment of the syntax, while other parts of the syntax can be inherited from Table 11 and Table 12.

As described above, decoded SEI message 1500 in FIG. 15 includes three indicators: nnpfc_purpose 1501, nnpfc_temp_factor 1502, and nnpfc_inp_range 1503. Decoded SEI message 1500 may also follow the syntax shown in Table 17.

TABLE 17

| Syntax of NNPFC SEI message for machine vision | |
| --- | --- |
| if(nnpfc_purpose = = 5){ | |
| nnpfc_inp_range | ue(v) |
| nnpfc_temp_factor | ue(v) |
| } | |

As shown in Table 17, nnpfc_inp_range (e.g., nnpfc_inp_range 1503 shown in FIG. 15) indicates the bidirectional input range of the reconstructed frames for the temporal upsampling network in a range from 1 to $2^{32}-1$ (inclusive). In some embodiments, as shown in FIG. 15, nnpfc_inp_range 1503 can be decoded as 32 bits.

As shown in Table 17, nnpfc_temp_factor (e.g., nnpfc_temp_factor 1502 shown in FIG. 15) indicates the temporal upsampling factor in a range from 1 to $2^{32}-1$ (inclusive), which means the upsampled frame number between the previous frame and current decoded (reconstructed) frame.

For example, if nnpfc_temp_factor 1502 is decoded as 2 and the current decoded (reconstructed) frame index is i, there should be 2 frames generated between decoded frame i−1 and decoded frame i by means of the temporal upsampling model.

In some embodiments, the solutions shown in Table 11 and Table 12 can be alternatively implemented as the following Table 18. Table 18 shows a segment of the syntax, while other parts of the syntax can be inherited from Table 11 and Table 12.

As described above, decoded SEI message 1500 includes three indicators. In some embodiments, there is a constraint for nnpfc_inp_range (e.g., nnpfc_inp_range 1503 shown in FIG. 15) and nnpfc_temp_factor (e.g., nnpfc_temp_factor 1502 shown in FIG. 15), which is $16 \geq nnpfc\_inp\_range/nnpfc\_temp\_factor \geq \frac{1}{16}$. The constraint here is a supplementary syntax of Table 18.

TABLE 18

| Syntax of NNPFC SEI message for machine vision | |
| --- | --- |
| if(nnpfc_purpose = = 5){ | |
| nnpfc_temp_factor | ue(v) |
| nnpfc_inp_range | ue(v) |
| } | | nnpfc_temp_factor (e.g., nnpfc_temp_factor 1502 shown in FIG. 15) indicates the temporal upsampling factor in a range from 1 to $2^{32}-1$ (inclusive), which means the upsampled frame number between the previous frame and current decoded (reconstructed) frame.

For example, if nnpfc_temp_factor 1502 is decoded as 2 and the current decoded (reconstructed) frame index is i, there should be 2 frames generated between decoded frame i−1 and decoded frame i by means of the temporal upsampling model. As also shown in Table 18, nnpfc_inp_range (e.g., nnpfc_inp_range 1503 shown in FIG. 15) indicates the bidirectional input range of the reconstructed frames for the temporal upsampling network in a range from 1 to $2^{32}-1$ (inclusive). Specifically, there is a constraint of nnpfc_inp_range from nnpfc_temp_factor, which is $16 \geq nnpfc\_inp\_range/nnpfc\_temp\_factor \geq \frac{1}{16}$.

In some embodiments, a non-transitory computer-readable storage medium storing a bitstream is also provided. The bitstream can be encoded and decoded according to the above-described NNPFC SEI message for machine vision.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for decoding video data, including:

generating a reconstructed frame sequence based on a compressed video;

decoding a SEI message with respect to the reconstructed frame sequence, according to the compressed video; and performing temporal upsampling to the reconstructed frame sequence based on the SEI message by using a neural network.

2. The method according to clause 1, wherein performing temporal upsampling to the reconstructed frame sequence includes:

determining, based on the SEI message, an upsampling number and a referencing range relative to a first frame and a second frame within the reconstructed frame sequence, the second frame being adjacent to the first frame; and interpolating, via the neural network, the upsampling number of frames between the first frame and the second frame by referencing within the referencing range.

3. The method according to clause 2, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

4. The method according to clause 3, wherein the referencing range is a product of the upsampling number and the upsampling strength when the second indicator is not equal to zero.

5. The method according to clause 4, wherein the SEI message further includes a third indicator for indicating the referencing range, and the referencing range is determined based on the third indicator when the second indicator is equal to zero.

6. The method according to clause 3, wherein the referencing range is a product of the upsampling strength plus one and the upsampling number.

7. The method according to clause 2, wherein the SEI message includes a first indicator for indicating the upsampling number, and a third indicator for indicating the referencing range, and wherein the referencing range is determined based on the third indicator.

8. The method according to clause 7, wherein a ratio of the referencing range to the upsampling number is within a predetermined range.

9. The method according to clause 8, wherein the predetermined range is [1/16, 16].

10. The method according to any of clauses 2 to 9, wherein the SEI message includes a fourth indicator for indicating whether to perform temporal resampling to the reconstructed frame sequence.

11. The method according to any of clauses 2 to 10, wherein interpolating the upsampling number of frames between the first frame and the second frame by referencing within the referencing range includes:

generating, based on the upsampling number and the referencing range, input tensors for the neural network; and receiving output tensors regarding the upsampling number of frames from the neural network.

12. A method for encoding video data, including:

compressing a frame sequence; and encoding a SEI message for the frame sequence, wherein the SEI message indicates whether to perform temporal upsampling to the frame sequence by using a neural network.

13. The method according to clause 12, wherein the SEI message further indicates how to perform temporal upsampling to the frame sequence by using the neural network.

14. The method according to clause 13, wherein the SEI message indicates an upsampling number and a referencing range, by which the neural network interpolates the upsampling number of frames between two adjacent frames of the frame sequence by referencing frames within the referencing range.

15. The method according to clause 14, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

16. The method according to clause 15, wherein the referencing range is a product of the upsampling number and the upsampling strength when the second indicator is not equal to zero.

17. The method according to clause 16, wherein the SEI message further includes a third indicator for indicating the referencing range, and the referencing range is determined based on the third indicator when the second indicator is equal to zero.

18. The method according to clause 15, wherein the referencing range is a product of the upsampling strength plus one and the upsampling number.

19. The method according to clause 14, wherein the SEI message includes a first indicator for indicating the upsampling number, and a third indicator for indicating the referencing range, and wherein the referencing range is determined based on the third indicator.

20. The method according to clause 19, wherein a ratio of the referencing range to the upsampling number is within a predetermined range.

21. The method according to clause 20, wherein the predetermined range is [1/16, 16].

22. The method according to any of clauses 14 to 21, wherein the SEI message includes a fourth indicator for indicating whether to perform temporal resampling to the reconstructed frame sequence.

23. The method according to any of clauses 14 to 22, wherein the upsampling number of frames between two adjacent frames is interpolated by performing the following operations:

generating, based on the upsampling number and the referencing range, input tensors for the neural network; and receiving output tensors regarding the upsampling number of frames from the neural network.

24. A non-transitory computer readable storage medium storing a bitstream of a video having a frame sequence, the bitstream including:

a SEI message with respect to the frame sequence, wherein the SEI message includes information descriptive of performing temporal upsampling to the frame sequence by using a neural network.

25. The non-transitory computer readable storage medium according to clause 24, wherein performing temporal upsampling to the reconstructed frame sequence includes:

determining, based on the SEI message, an upsampling number and a referencing range relative to a first frame and a second frame within the reconstructed frame sequence, the second frame being adjacent to the first frame; and interpolating, via the neural network, the upsampling number of frames between the first frame and the second frame by referencing within the referencing range.

26. The non-transitory computer readable storage medium according to clause 25, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

27. The non-transitory computer readable storage medium according to clause 26, wherein the referencing range is a product of the upsampling number and the upsampling strength when the second indicator is not equal to zero.

28. The non-transitory computer readable storage medium according to clause 27, wherein the SEI message further includes a third indicator for indicating the referencing range, and the referencing range is determined based on the third indicator when the second indicator is equal to zero.

29. The non-transitory computer readable storage medium according to clause 26, wherein the referencing range is a product of the upsampling strength plus one and the upsampling number.

30. The non-transitory computer readable storage medium according to clause 25, wherein the SEI message includes a first indicator for indicating the upsampling number, and a third indicator for indicating the referencing range, and wherein the referencing range is determined based on the third indicator.

31. The non-transitory computer readable storage medium according to clause 30, wherein a ratio of the referencing range to the upsampling number is within a predetermined range.

32. The non-transitory computer readable storage medium according to clause 31, wherein the predetermined range is [$\frac{1}{16}$, 16].

33. The non-transitory computer readable storage medium according to any of clauses 25 to 32, wherein the SEI message includes a fourth indicator for indicating whether to perform temporal resampling to the reconstructed frame sequence.

34. The non-transitory computer readable storage medium according to any of clauses 25 to 33, wherein interpolating the upsampling number of frames between the first frame and the second frame by referencing within the referencing range includes:

generating, based on the upsampling number and the referencing range, input tensors for the neural network; and receiving output tensors regarding the upsampling number of frames from the neural network.

35. A non-transitory computer readable storage medium storing a bitstream generated by a method including:

compressing a frame sequence; and encoding a SEI message for the frame sequence, wherein the SEI message indicates whether to perform temporal upsampling to the frame sequence by using a neural network.

36. The non-transitory computer readable storage medium according to clause 35, wherein the SEI message further indicates how to perform temporal upsampling to the frame sequence by using the neural network.

37. The non-transitory computer readable storage medium according to clause 36, wherein the SEI message indicates an upsampling number and a referencing range, by which the neural network interpolates the upsampling number of frames between two adjacent frames of the frame sequence by referencing frames within the referencing range.

38. The non-transitory computer readable storage medium according to clause 37, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

39. The non-transitory computer readable storage medium according to clause 38, wherein the referencing range is a product of the upsampling number and the upsampling strength when the second indicator is not equal to zero.

40. The non-transitory computer readable storage medium according to clause 39, wherein the SEI message further includes a third indicator for indicating the referencing range, and the referencing range is determined based on the third indicator when the second indicator is equal to zero.

41. The non-transitory computer readable storage medium according to clause 38, wherein the referencing range is a product of the upsampling strength plus one and the upsampling number.

42. The non-transitory computer readable storage medium according to clause 37, wherein the SEI message includes a first indicator for indicating the upsampling number, and a third indicator for indicating the referencing range, and wherein the referencing range is determined based on the third indicator.

43. The non-transitory computer readable storage medium according to clause 42, wherein a ratio of the referencing range to the upsampling number is within a predetermined range.

44. The non-transitory computer readable storage medium according to clause 43, wherein the predetermined range is [$\frac{1}{16}$, 16].

45. The non-transitory computer readable storage medium according to any of clauses 37 to 44, wherein the SEI message includes a fourth indicator for indicating whether to perform temporal resampling to the reconstructed frame sequence.

46. The non-transitory computer readable storage medium according to any of clauses 37 to 45, wherein the upsampling number of frames between two adjacent frames is interpolated by performing the following operations:

generating, based on the upsampling number and the referencing range, input tensors for the neural network; and receiving output tensors regarding the upsampling number of frames from the neural network.

47. An image data processing apparatus, including:

a memory storing a set of instructions; and one or more processors configured to execute the set of instructions to cause the apparatus to perform operations including:

generating a reconstructed frame sequence based on a compressed video;

decoding a SEI message with respect to the reconstructed frame sequence, according to the compressed video; and performing temporal upsampling to the reconstructed frame sequence based on the SEI message by using a neural network.

48. The apparatus according to clause 47, wherein performing temporal upsampling to the reconstructed frame sequence includes:

determining, based on the SEI message, an upsampling number and a referencing range relative to a first frame and a second frame within the reconstructed frame sequence, the second frame being adjacent to the first frame; and interpolating, via the neural network, the upsampling number of frames between the first frame and the second frame by referencing within the referencing range.

49. The apparatus according to clause 48, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

50. The apparatus according to clause 49, wherein the referencing range is a product of the upsampling number and the upsampling strength when the second indicator is not equal to zero.

51. The apparatus according to clause 50, wherein the SEI message further includes a third indicator for indicating the referencing range, and the referencing range is determined based on the third indicator when the second indicator is equal to zero.

52. The apparatus according to clause 49, wherein the referencing range is a product of the upsampling strength plus one and the upsampling number.

53. The apparatus according to clause 48, wherein the SEI message includes a first indicator for indicating the upsampling number, and a third indicator for indicating the referencing range, and wherein the referencing range is determined based on the third indicator.

54. The apparatus according to clause 53, wherein a ratio of the referencing range to the upsampling number is within a predetermined range.

55. The apparatus according to clause 54, wherein the predetermined range is [$\frac{1}{16}$, 16].

56. The apparatus according to any of clauses 48 to 55, wherein the SEI message includes a fourth indicator for indicating whether to perform temporal resampling to the reconstructed frame sequence.

57. The apparatus according to any of clauses 48 to 56, wherein interpolating the upsampling number of frames between the first frame and the second frame by referencing within the referencing range includes:

generating, based on the upsampling number and the referencing range, input tensors for the neural network; and receiving output tensors regarding the upsampling number of frames from the neural network.

58. An image data processing apparatus, including:
a memory storing a set of instructions; and
one or more processors configured to execute the set of instructions to cause the apparatus to perform operations including:
    compressing a frame sequence; and
    encoding a SEI message for the frame sequence,
    wherein the SEI message indicates whether to perform temporal upsampling to the frame sequence by using a neural network.

59. The apparatus according to clause 58, wherein the SEI message further indicates how to perform temporal upsampling to the frame sequence by using the neural network.

60. The apparatus according to clause 59, wherein the SEI message indicates an upsampling number and a referencing range, by which the neural network interpolates the upsampling number of frames between two adjacent frames of the frame sequence by referencing frames within the referencing range.

61. The apparatus according to clause 60, wherein the SEI message includes a first indicator for indicating the upsampling number, and a second indicator for indicating an upsampling strength describing a relationship between the upsampling number and the referencing range, and wherein the referencing range is determined based on the first indicator and the second indicator.

62. The apparatus according to clause 61, wherein the referencing range is a product of the upsampling number and the upsampling strength when the second indicator is not equal to zero.

63. The apparatus according to clause 62, wherein the SEI message further includes a third indicator for indicating the referencing range, and the referencing range is determined based on the third indicator when the second indicator is equal to zero.

64. The apparatus according to clause 61, wherein the referencing range is a product of the upsampling strength plus one and the upsampling number.

65. The apparatus according to clause 60, wherein the SEI message includes a first indicator for indicating the upsampling number, and a third indicator for indicating the referencing range, and wherein the referencing range is determined based on the third indicator.

66. The apparatus according to clause 65, wherein a ratio of the referencing range to the upsampling number is within a predetermined range.

67. The apparatus according to clause 66, wherein the predetermined range is [$\frac{1}{16}$, 16].

68. The apparatus according to any of clauses 60 to 67, wherein the SEI message includes a fourth indicator for indicating whether to perform temporal resampling to the reconstructed frame sequence.

69. The apparatus according to any of clauses 60 to 68, wherein the upsampling number of frames between two adjacent frames is interpolated by performing the following operations:

generating, based on the upsampling number and the referencing range, input tensors for the neural network; and receiving output tensors regarding the upsampling number of frames from the neural network.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for decoding video data, comprising:
generating a reconstructed frame sequence based on a compressed video;
decoding a supplemental enhancement information (SEI) message with respect to the reconstructed frame sequence, according to the compressed video; and
performing temporal upsampling to the reconstructed frame sequence based on the SEI message by using a neural network;
wherein the SEI message comprises a first indicator for indicating an upsampling number, and a second indicator for indicating an upsampling strength describing a relationship between the upsampling number and a referencing range, and
wherein the referencing range is determined based on the first indicator and the second indicator.

2. The method according to claim 1, wherein performing temporal upsampling to the reconstructed frame sequence comprises:
determining, based on the SEI message, the upsampling number and the referencing range relative to a first frame and a second frame within the reconstructed frame sequence, the second frame being adjacent to the first frame; and
interpolating, via the neural network, the upsampling number of frames between the first frame and the second frame by referencing within the referencing range.

3. The method according to claim 1, wherein the referencing range is a product of the upsampling number and the upsampling strength when the second indicator is not equal to zero.

4. The method according to claim 3, wherein the SEI message further comprises a third indicator for indicating the referencing range, and the referencing range is determined based on the third indicator when the second indicator is equal to zero.

5. The method according to claim 1, wherein the referencing range is a product of the upsampling strength plus one and the upsampling number.

6. The method according to claim 2, wherein the SEI message comprises a third indicator for indicating the referencing range.

7. The method according to claim 6, wherein a ratio of the referencing range to the upsampling number is within a predetermined range.

8. The method according to claim 7, wherein the predetermined range is [1/16, 16].

9. The method according to claim 2, wherein the SEI message comprises a fourth indicator for indicating whether to perform temporal resampling to the reconstructed frame sequence.

10. The method according to claim 2, wherein interpolating the upsampling number of frames between the first frame and the second frame by referencing within the referencing range comprises:
generating, based on the upsampling number and the referencing range, input tensors for the neural network; and
receiving output tensors regarding the upsampling number of frames from the neural network.

11. A method for encoding video data, comprising:
compressing a frame sequence; and
encoding a supplemental enhancement information (SEI) message for the frame sequence,
wherein the SEI message indicates whether to perform temporal upsampling to the frame sequence by using a neural network;
wherein the SEI message comprises a first indicator for indicating an upsampling number, and a second indicator for indicating an upsampling strength describing a relationship between the upsampling number and a referencing range, and
wherein the referencing range is determined based on the first indicator and the second indicator.

12. The method according to claim 11, wherein the SEI message further indicates how to perform temporal upsampling to the frame sequence by using the neural network.

13. The method according to claim 12, wherein the neural network interpolates the upsampling number of frames between two adjacent frames of the frame sequence by referencing frames within the referencing range.

14. The method according to claim 11, wherein the SEI message further comprises a third indicator for indicating the referencing range, and the referencing range is determined based on the third indicator when the second indicator is equal to zero.

15. The method according to claim 13, wherein the SEI message comprises a third indicator for indicating the referencing range.

16. A method for signaling a bitstream, the method comprising:
receiving a frame sequence;
encoding the frame sequence by:
encoding a supplemental enhancement information (SEI) message for the frame sequence, wherein the SEI message indicates whether to perform temporal upsampling to the frame sequence by using a neural network; wherein the SEI message comprises a first indicator for indicating an upsampling number, and a second indicator for indicating an upsampling strength describing a relationship between the upsampling number and a referencing range, and wherein the referencing range is determined based on the first indicator and the second indicator; and
signaling a bitstream that is generated based on the encoding.

17. The method according to claim 16, wherein the SEI message further indicates how to perform temporal upsampling to the frame sequence by using the neural network.

18. The method according to claim 17, wherein the neural network interpolates the upsampling number of frames between two adjacent frames of the frame sequence by referencing frames within the referencing range.

19. The method according to claim 16, wherein the SEI message further comprises a third indicator for indicating the referencing range, and the referencing range is determined based on the third indicator when the second indicator is equal to zero.

* * * * *